United States Patent
Asamura et al.

(10) Patent No.: US 12,359,705 B2
(45) Date of Patent: Jul. 15, 2025

(54) VIBRATION SUPPRESSION DEVICE FOR ROPE-LIKE BODY OF ELEVATOR

(71) Applicant: Mitsubishi Electric Corporation, Tokyo (JP)

(72) Inventors: Tomohiro Asamura, Tokyo (JP); Eiichi Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 713 days.

(21) Appl. No.: 17/772,525

(22) PCT Filed: Nov. 6, 2019

(86) PCT No.: PCT/JP2019/043480
§ 371 (c)(1),
(2) Date: Apr. 28, 2022

(87) PCT Pub. No.: WO2021/090400
PCT Pub. Date: May 14, 2021

(65) Prior Publication Data
US 2022/0381317 A1 Dec. 1, 2022

(51) Int. Cl.
*B66B 1/28* (2006.01)
*B66B 7/06* (2006.01)
*F16F 15/02* (2006.01)

(52) U.S. Cl.
CPC .............. *F16F 15/02* (2013.01); *B66B 7/06* (2013.01)

(58) Field of Classification Search
CPC ........ F16F 15/005; F16F 15/002; F16F 15/02; B66B 7/06; B66B 7/10
See application file for complete search history.

(56) References Cited

U.S. PATENT DOCUMENTS

| 12,049,385 B2 * | 7/2024 | Saito ..................... B66B 1/3476 |
| 12,098,059 B2 * | 9/2024 | Saito ......................... B66B 7/10 |

(Continued)

FOREIGN PATENT DOCUMENTS

| JP | 2-117583 A | 5/1990 |
| JP | 3-26682 A | 2/1991 |

(Continued)

OTHER PUBLICATIONS

International Search Report mailed on Jan. 7, 2020, received for PCT Application PCT/JP2019/043480, Filed on Nov. 6, 2019, 5 pages including English Translation.

*Primary Examiner* — Nicholas J Lane
(74) *Attorney, Agent, or Firm* — XSENSUS LLP

(57) ABSTRACT

There is provided a vibration suppression device of a rope-like body that can use a negative restoring force that amplifies a displacement of a rope-like body of an elevator to prevent the displacement from becoming unstable. A vibration suppression device (21) includes a first displacement measurement unit, a first displacement amplifier, and a control unit (24). The first displacement measurement unit measures a displacement in a lateral direction of the rope-like body due to vibration about an equilibrium position (20) at a first position (P1) in a longitudinal direction of the rope-like body. The first displacement amplifier applies, to the rope-like body, a negative restoring force that amplifies the displacement of the rope-like body. The control unit (24) causes the first displacement amplifier to apply a negative restoring force smaller than a positive restoring force, based on the displacement measured by the first displacement measurement unit.

11 Claims, 20 Drawing Sheets

(56) References Cited

U.S. PATENT DOCUMENTS

| | | | |
|---|---|---|---|
| 12,103,823 B2* | 10/2024 | Saito | B66B 5/022 |
| 12,227,391 B2* | 2/2025 | Saito | F16F 13/007 |
| 2009/0229922 A1* | 9/2009 | Smith | B66B 1/42 |
| | | | 187/264 |
| 2014/0229011 A1* | 8/2014 | Fukui | G05B 15/02 |
| | | | 700/275 |
| 2015/0027814 A1* | 1/2015 | Benosman | B66B 5/02 |
| | | | 187/247 |
| 2016/0272463 A1* | 9/2016 | Benosman | B66B 5/0018 |
| 2021/0094793 A1 | 4/2021 | Saito et al. | |
| 2021/0094799 A1 | 4/2021 | Saito et al. | |
| 2021/0130127 A1 | 5/2021 | Saito et al. | |
| 2021/0231190 A1 | 7/2021 | Saito et al. | |
| 2021/0347607 A1* | 11/2021 | Castro Inzunza | B66B 7/1246 |
| 2022/0112052 A1* | 4/2022 | Nakazawa | B66B 7/10 |

FOREIGN PATENT DOCUMENTS

| | | | |
|---|---|---|---|
| JP | 3-51279 A | 3/1991 | |
| JP | 2003-192242 A | 7/2003 | |
| JP | 2014-159328 A | 9/2014 | |
| WO | WO-2019069508 A1 * | 4/2019 | B66B 1/06 |

* cited by examiner

VIBRATION SUPPRESSION DEVICE FOR ROPE-LIKE BODY OF ELEVATOR

CROSS-REFERENCE TO RELATED APPLICATION

The present application is based on PCT filing PCT/JP2019/043480, filed Nov. 6, 2019, the entire contents of which is incorporated herein by reference.

FIELD

The present invention relates to a vibration suppression device for a rope-like body of an elevator.

BACKGROUND

PTL 1 discloses an example of a vibration suppression device. The vibration suppression device is provided near an end of a main rope on a car. The vibration suppression device exerts a negative restoring force on the main rope of an elevator to thereby amplify a displacement of the main rope. The vibration suppression device suppresses the vibration of the main rope by the frictional resistance accompanied by the vibration.

CITATION LIST

Patent Literature

[PTL 1] JP H3-26682 A

SUMMARY

Technical Problem

However, the vibration suppression device of PTL 1 produces the negative restoring force using an unstable mechanism in which an inverted lever and a spring are combined. The negative restoring force produced by the unstable mechanism increases nonlinearly with respect to an increase in displacement of the main rope. Therefore, when the displacement of the main rope increases, the negative restoring force excessively increases, which may result in unstable displacement of the main rope. In this case, the vibration suppression device cannot suppress the vibration of the main rope using the negative restoring force.

The present invention has been made in order to solve the problem described above. An object of the present invention is to provide a vibration suppression device for a rope-like body of an elevator, the vibration suppression device being capable of using a negative restoring force that amplifies a displacement of the rope-like body such as a main rope to prevent the displacement from becoming unstable.

Solution to Problem

A vibration suppression device according to the present invention for a rope-like body of an elevator includes: a first displacement measurement unit to measure a displacement in a lateral direction of the rope-like body due to vibration about an equilibrium position at a first position in a longitudinal direction of the rope-like body of the elevator; a first displacement amplifier to apply, to the rope-like body, a negative restoring force that amplifies the displacement of the rope-like body; and a control unit to cause the first displacement amplifier to apply the negative restoring force smaller than a positive restoring force to return the rope-like body to the equilibrium position, based on the displacement measured by the first displacement measurement unit.

Advantageous Effects of Invention

The vibration suppression device according to the present invention can use a negative restoring force that amplifies a displacement of a rope-like body of an elevator to prevent the displacement from becoming unstable.

DESCRIPTION OF EMBODIMENTS

Hereinafter, embodiments for carrying out the present invention will be described with reference to the accompanying drawings. In each figure, the same reference signs are assigned to the same or corresponding parts, and redundant description is appropriately simplified or omitted.

Embodiment 1

Figure 1:
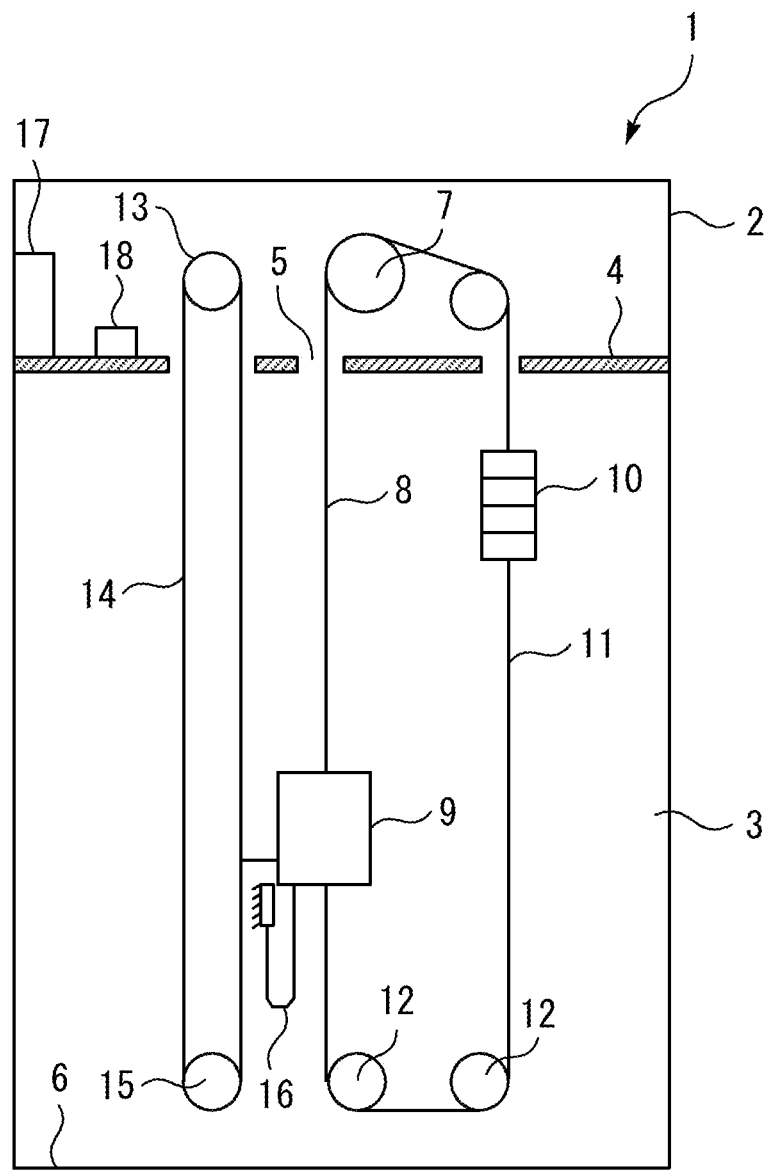
FIG. 1 A configuration diagram of an elevator according to Embodiment 1.
Figure 1:
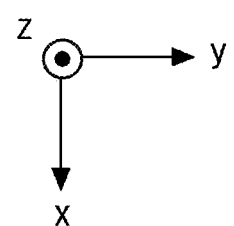
Figure 2:
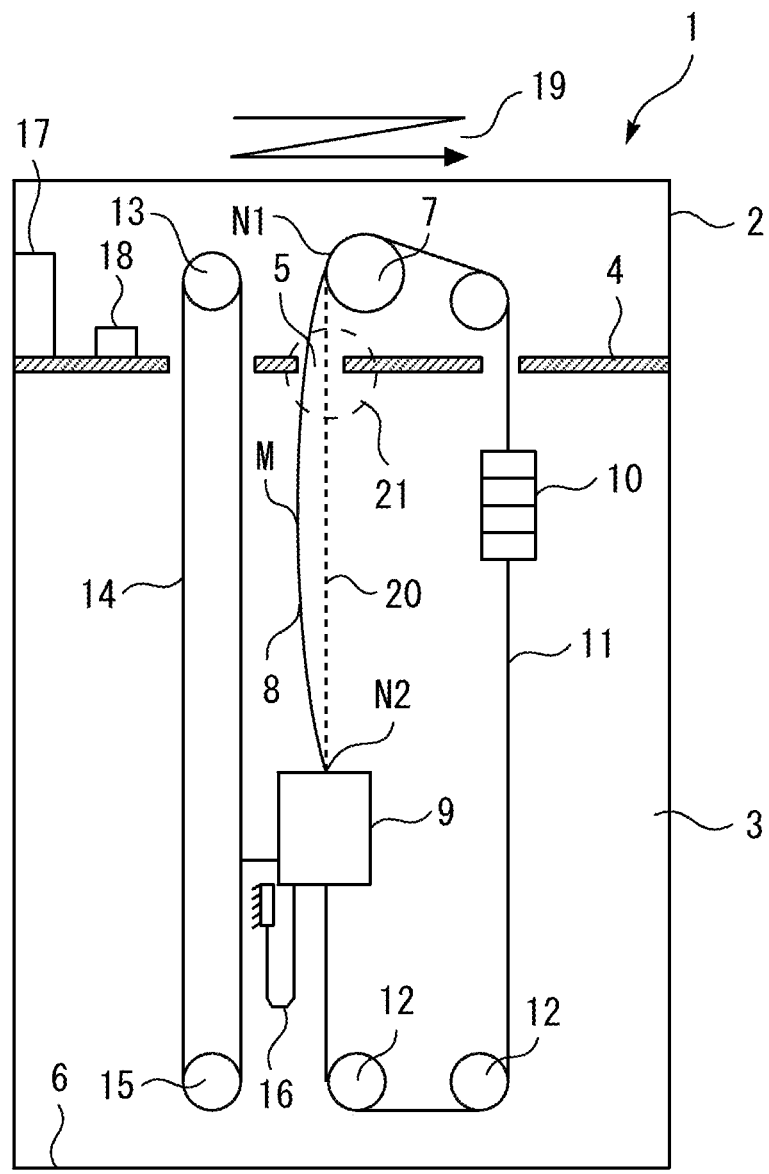
FIG. 2 A configuration diagram of the elevator according to Embodiment 1.

FIG. 1 and FIG. 2 are a configuration diagram of an elevator according to Embodiment 1.

In an example illustrated in FIG. 1, the elevator 1 is applied to a building 2 having a plurality of floors. In the elevator 1, a hoistway 3 is formed throughout the plurality of floors of the building 2. In the elevator 1, a machine room 4 is provided above the hoistway 3. In the machine room 4, a rope duct 5 is formed in a floor surface. The rope duct 5 is an opening leading to the hoistway 3 from the machine room 4. In the elevator 1, a pit 6 is provided in a lower end of the hoistway 3, for example.

The elevator 1 includes a traction machine 7, a main rope 8, a car 9, a counterweight 10, a compensation rope 11, and tension sheaves 12. The traction machine 7 is provided in the machine room 4, for example. The traction machine 7 has a sheave and a motor. The sheave of the traction machine 7 is connected to a rotation shaft of the motor of the traction machine 7. The motor of the traction machine 7 is a device configured to generate a driving force for rotating the sheave of the traction machine 7. The main rope 8 is wrapped around the sheave of the traction machine 7. The main rope 8 extends from the machine room 4 to the hoistway 3 through the rope duct 5. The car 9 and the counterweight 10 are suspended by the main rope 8 in the hoistway 3. The car 9 is a device configured to transport passengers or the like among the plurality of floors by running vertically in the hoistway 3. The counterweight 10 is a device configured to balance a load applied to the sheave of the traction machine 7 with the car 9 through the main rope 8. The car 9 and the counterweight 10 run in the opposite direction to each other in the hoistway 3 when the main rope 8 moves by rotation of the sheave of the traction machine 7. The compensation rope 11 is a device configured to compensate for unbalance between a dead load on the car 9 side of the main rope 8 and a dead load on the counterweight 10 side of the main rope 8, the unbalance being caused by movement of the main rope 8. One end of the compensation rope 11 is attached to the car 9. The other end of the compensation rope 11 is attached to the counterweight 10. The compensation rope 11 is wrapped around the tension sheaves 12. The tension sheaves 12 are sheaves for applying tension to the compensation rope 11. The tension sheaves 12 are provided in the pit 6, for example. The main rope 8 is an example of the rope-like body of the elevator 1. The compensation rope 11 is an example of the rope-like body of the elevator 1. Examples of the rope-like body of the elevator 1 may include a steel wire rope, a belt rope, and a chain.

The elevator 1 includes a governor 13, a governor rope 14, and a governor rope tension sheave 15. The governor 13 is provided in the machine room 4, for example. The governor 13 is a device configure to reduce an excessive running velocity of the car 9. The governor 13 has a sheave. The governor rope 14 is wrapped around the sheave of the governor 13. Both ends of the governor rope 14 are attached to the car 9. The governor rope 14 is wrapped around the governor rope tension sheave 15. The governor rope tension sheave 15 is a sheave for applying tension to the governor rope 14. The governor rope tension sheave 15 is provided in the pit 6, for example. The governor rope 14 is an example of the rope-like body of the elevator 1.

The elevator 1 includes a traveling cable 16 and a control panel 17. The traveling cable 16 is a cable for communicating a control signal or the like. One end of the traveling cable 16 is connected to the car 9. The other end of the traveling cable 16 is attached to a wall surface of the hoistway 3, for example. The control panel 17 is a device configured to control the operation of the elevator 1. The control panel 17 is provided in the machine room 4, for example. The control panel 17 communicates a control signal to the car 9 through the traveling cable 16, for example. The traveling cable 16 is an example of the rope-like body of the elevator 1.

The elevator 1 includes a building sway detector 18. The building sway detector 18 is a device configured to detect building sway. The building sway detector 18 is provided in the machine room 4, for example. The building sway detector 18 may be provided in the pit 6, for example. The building sway is sway of the building 2 which occurs due to turbulence such as earthquakes or winds, for example. The building sway detector 18 outputs a detection signal when detecting building sway greater than a preset threshold, for example. The magnitude of building sway is judged by amplitude or acceleration of the sway, for example.

The following description will be made using an xyz orthogonal coordinate system set as follows. A positive direction of the x-axis corresponds to a vertical downward direction. The yz plane is a horizontal plane. A direction of the z-axis corresponds to a direction of a rotation shaft of the sheave of the traction machine 7, for example.

FIG. 2 is a diagram illustrating a state where building sway 19 is occurring in the elevator 1. When the building sway 19 occurs, the traction machine 7 and the governor 13 which are fixed to the building 2 sway together with the building 2. Thus, the vibration is applied to the main rope 8, the compensation rope 11, the governor rope 14, and the traveling cable 16 which are examples of the rope-like body of the elevator 1. Here, when the frequency of the building sway 19 coincides with the natural frequency of any of the rope-like bodies, the sway of the rope-like body increases due to the resonance phenomenon. When the resonance phenomenon occurs in the elevator, the rope-like body often resonates with the fundamental vibration. The fundamental vibration is vibration corresponding to the lowest natural frequency. In an example illustrated in FIG. 2, the resonance phenomenon is occurring with the fundamental vibration of a portion on the car 9 side of the main rope 8.

In this example, the portion on the car 9 side of the main rope 8 is drawn from the sheave of the traction machine 7 toward the hoistway 3 and is attached to the car 9. Therefore, nodes of the fundamental vibration of the portion on the car 9 side of the main rope 8 are a point N1 drawn from the sheave of the traction machine 7 and a point N2 attached to the car 9. An antinode of the fundamental vibration of the portion on the car 9 side of the main rope 8 is a midpoint M between the two nodes. The portion on the car 9 side of the main rope 8 vibrates in a lateral direction about an equilibrium position 20 due to a positive restoring force. The equilibrium position 20 is a position of the rope-like body in a state where it is not vibrating. The positive restoring force is a force acting on the rope-like body that is displaced from the equilibrium position 20 in a direction of returning the rope-like body to the equilibrium position 20. The positive restoring force is a force of the tension of the rope-like body, for example. The lateral direction is a direction perpendicular to the longitudinal direction of the rope-like body, for example. Hereinafter, the portion on the car 9 side of the main rope 8 will be described as an example of a vibrating portion of the rope-like body.

When the rope-like body greatly vibrates, it may cause a trouble in operation of the elevator 1. Therefore, a vibration suppression device 21 is provided in the elevator 1. The vibration suppression device 21 is a device for suppressing the vibration of the vibrating portion of the rope-like body. The vibration suppression device 21 is provided in a portion closer to the node than to the antinode of the vibrating portion of the rope-like body, for example. In this example, the vibration suppression device 21 is provided in the rope duct 5 in the machine room 4.

Subsequently, a configuration of the vibration suppression device 21 will be described with reference to FIG. 3.

Figure 3:
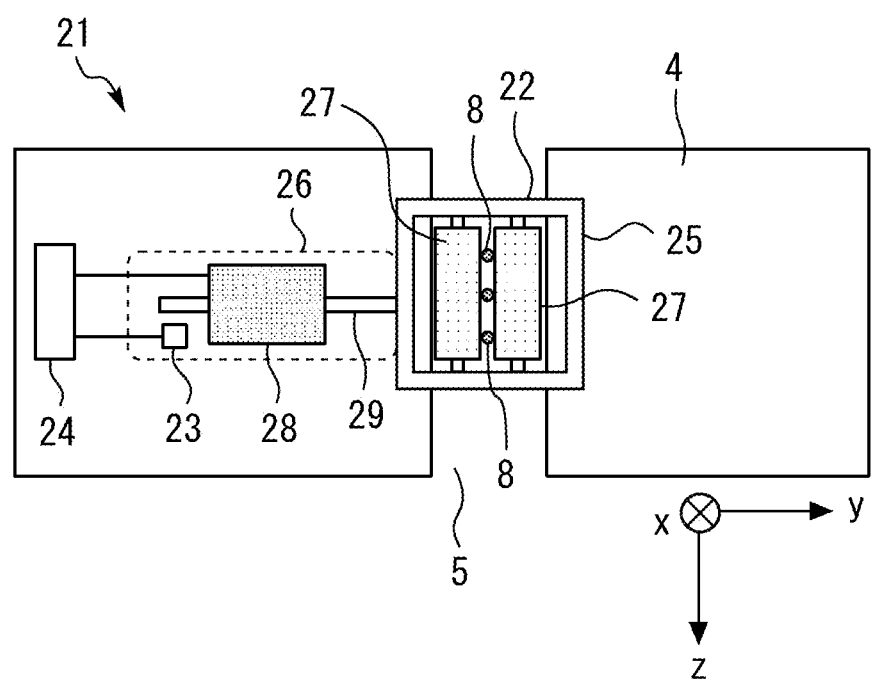
FIG. 3 A configuration diagram of the vibration suppression device according to Embodiment 1.

FIG. 3 is a configuration diagram of the vibration suppression device according to Embodiment 1.

FIG. 3 is a diagram illustrating the vibration suppression device 21 when viewed from the top.

The vibration suppression device 21 includes a displacement amplifier 22, a displacement measurement unit 23, and a control unit 24.

The displacement amplifier 22 includes a contact portion 25, and an actuator 26. The contact portion 25 is a portion that contacts the main rope 8 from the lateral direction so as to be displaceable in the lateral direction integrally with the main rope 8 serving as the rope-like body. The contact portion 25 includes a pair of rollers 27 parallel to each other, for example. The pair of rollers 27 are arranged to sandwich the main rope 8 therebetween. The contact portion 25 is displaced in the lateral direction integrally with the main rope 8 through the pair of rollers 27. In this example, the contact portion 25 is displaced in the y direction integrally with the main rope 8. The contact portion 25 does not restrain the movement in the longitudinal direction of the main rope 8. The actuator 26 is, for example, a linear motor. The actuator 26 includes a stator 28 and a mover 29. The stator 28 is fixed in the machine room 4 in which the vibration suppression device 21 is provided. The mover 29 moves linearly with respect to the stator 28. The mover 29 is connected to the contact portion 25. The actuator 26 moves the mover 29 to thereby apply a vibration suppression force to the main rope 8 through the contact portion 25. The vibration suppression force is a force in the lateral direction to be applied to the rope-like body by the displacement amplifier 22 of the vibration suppression device 21. The displacement amplifier 22 is an example of a first displacement amplifier.

In this example, the elevator 1 includes a plurality of main ropes 8. The contact portion 25 is arranged to collectively sandwich the plurality of main ropes 8. Note that, in the elevator 1, the number of the main ropes 8 may be one. The contact portion 25 may be arranged to collectively sandwich a plurality of portions of one main rope 8 formed by being folded back around the sheave or the like.

The displacement measurement unit 23 is a unit configured to measure a displacement in the lateral direction of the rope-like body due to the vibration. The displacement measurement unit 23 measures the displacement of the main rope 8 by detecting the movement of the mover 29 that is displaced integrally with the main rope 8, for example. Examples of the displacement measurement unit 23 include a linear encoder, an acceleration sensor, and a camera. The displacement measurement unit 23 is an example of a first displacement measurement unit.

The control unit 24 is a unit configured to control a vibration suppression force to be applied to the rope-like body by the displacement amplifier 22 based on the displacement measured by the displacement measurement unit 23. The control unit 24 causes the the displacement amplifier 22 to apply a negative restoring force that amplifies the displacement of the rope-like body, as a component of the vibration suppression force to be applied to the rope-like body. The negative restoring force is a force in a direction away from the equilibrium position 20 of the rope-like body. In this example, the magnitude of the negative restoring force increases as the displacement increases. The negative restoring force is a negative rigidity force, for example. Here, the negative rigidity force is a force in the same direction as the displacement proportional to the magnitude of the displacement. The positive linear rigidity force or elastic force is a force in an opposite direction to the displacement proportional to the magnitude of the displacement. Therefore, the negative rigidity force can be regarded as a force when a proportionality coefficient of the displacement in the rigidity force is set to a negative value.

Subsequently, the principle of the vibration suppression by the vibration suppression device 21 will be described with reference to FIG. 4 and FIG. 5.

Figure 4:
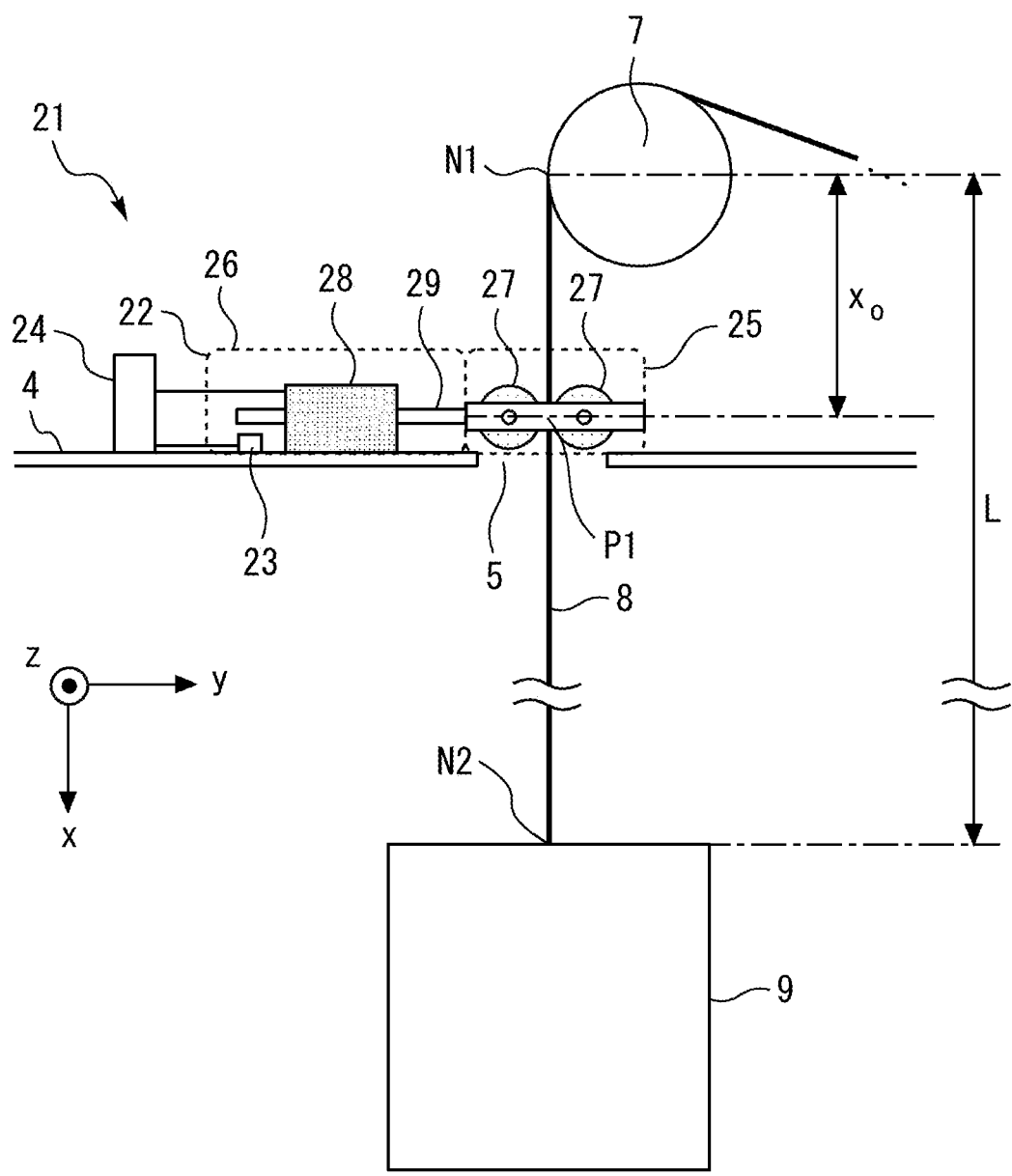
FIG. 4 A configuration diagram of the vibration suppression device according to Embodiment 1.

FIG. 4 is a configuration diagram of the vibration suppression device according to Embodiment 1. FIG. 5 is a diagram illustrating an example of the vibration suppression performance of the vibration suppression device according to Embodiment 1.

FIG. 4 is a diagram illustrating the vibration suppression device 21 when viewed from the direction parallel to the z-axis. A length of the vibrating portion of the main rope 8 is a length between the point N1 and the point N2 which are at both ends of the vibrating portion. The length of the vibrating portion of the main rope 8 is represented as L. A position in the x direction where the point N1 which is a node at the end of the vibrating portion is taken as the origin is represented as x. The displacement amplifier 22 is arranged at a position $x_0$. The position $x_0$ is an example of a first position P1 in the longitudinal direction of the main rope 8. The displacement measurement unit 23 measures the displacement of the main rope 8 at the position $x_0$.

The time where the stand-still state of the main rope 8 is taken as the origin is represented as t. That is, the initial conditions are that the main rope 8 stands still at time 0. The displacement in the lateral direction of the main rope 8 due to vibration at time t and the position x is represented by a function v(x, t). The tension applied to the main rope 8 is represented as T. The linear density of the main rope 8 is represented as p. When a plurality of main ropes 8 are provided, each value of the tension T and the linear density p may be a value of the sum or average for the plurality of main ropes 8, for example. The vibration suppression force by the displacement amplifier 22 is represented as $F_{cmp}$. At this time, an equation of motion of the vibration of the main rope 8 is represented by the following Expression (1). Herein, δ(•) represents the Dirac delta function.

[Math. 1]

$$\rho \frac{\partial^2 v(x,t)}{\partial t^2} = T \frac{\partial^2 v(x,t)}{\partial x^2} - F_{cmp}\delta(x-x_0) \quad (1)$$

Expression (1) is an equation representing a wave propagation in the main rope 8. The wave propagation velocity c is represented by the following Expression (2).

[Math. 2]

$$c = \sqrt{\frac{T}{\rho}} \quad (2)$$

The displacement of building sway is represented as $v_{ext}$. An end point N1 of the vibrating portion is a point at which the main rope 8 is drawn from the sheave of the traction machine 7. The sheave of the traction machine 7 is fixed and provided to the building 2. Therefore, the end point N1 is displaced together with the building 2 due to the building sway 19. At this time, the boundary conditions at the end point N1 are represented by the following Expression (3).

[Math. 3]

$$v(0,t) = v_{ext} \quad (3)$$

An end point N2 of the vibrating portion is a point fixed to the car 9. The car 9 is not fixed to the building 2. Therefore, it can be conceived that the displacement of the end point N2 due to the building sway is not caused. At this time, the boundary conditions at the end point N2 are represented by the following Expression (4).

[Math. 4]

$$v(L,t) = 0 \quad (4)$$

When Laplace transform is performed on Expression (1) based on these boundary conditions and initial conditions, the following Expression (5) is obtained. Herein, s is a variable in frequency domain in the Laplace transform. Herein, sinh(•) represents the hyperbolic sine function.

[Math. 5]

$$V(x,s) = \frac{\sinh\frac{s}{c}(L-x_0)}{\sinh\frac{s}{c}L}\left[V_{ext} - \frac{c}{s}\cdot\sinh\frac{s}{c}x_0 \cdot \frac{1}{T}F_{cmp}\right] \quad (5)$$

Herein, the displacement amplifier 22 is provided in the vicinity of the end point N1 of the vibrating portion of the main rope 8. At this time, it can be conceived that a value of the position $x_0$ at which the displacement amplifier 22 is provided is sufficiently smaller than a value of the length L of the vibrating portion of the main rope 8. In this case, the displacement $V(x_0, s)$ in the lateral direction of the main rope 8 at a position at which the displacement amplifier 22 is provided is expressed by the following Expression (6). It should be noted that $\alpha$ is introduced by $\alpha = (L-x_0)^3/L^3$ for simplification.

[Math. 6]

$$V(x_0,s) = \left(\frac{L-x_0}{L}\right)^3 \frac{s^2+\omega_{x0}^2}{s^2+\omega_L^2}\left[V_{ext} - \frac{x_0}{T}F_{cmp}\right] = \alpha\frac{s^2+\omega_{x0}^2}{s^2+\omega_L^2}\left[V_{ext} - \frac{x_0}{T}F_{cmp}\right] \quad (6)$$

Herein, $\omega_L$ is the natural frequency of the fundamental vibration of the main rope 8 when the length of the main rope 8 is L. $\omega_L$ is represented by the following Expression (7). $\omega_{x0}$ is the natural frequency of the fundamental vibration of the main rope 8 when the length of the main rope 8 is L-$x_0$. $\omega_{x0}$ is represented by the following Expression (8).

[Math. 7]

$$\omega_L = \frac{\pi}{L}\sqrt{\frac{T}{\rho}} \quad (7)$$

[Math. 8]

$$\omega_{x0} = \frac{\pi}{L-x_0}\sqrt{\frac{T}{\rho}} \quad (8)$$

Herein, it is assumed that the vibration suppression force $F_{cmp}$ by the displacement amplifier 22 is the resultant force of a component of the rigidity force and a component of the viscous force. The rigidity force may be a pseudo rigidity force which is not only a force derived from the rigidity of the material. The viscous force may be a pseudo viscous force which is not only a force derived from the viscosity of the material.

The rigidity value of the component of the rigidity force is represented as $K_p$. The viscosity value of the component of the viscous force is represented as $D_p$. Herein, the displacement amplifier 22 applies the negative rigidity force to the main rope 8 under the control of the control unit 24. When the displacement amplifier 22 applies the negative rigidity force to the main rope 8, the rigidity value $K_p$ has a negative value. That is, the displacement amplifier 22 applies, to the main rope 8, the negative rigidity force proportional to the displacement, using the rigidity value $K_p$ as a negative displacement control gain. The displacement amplifier 22 further applies, to the main rope 8, the viscous force proportional to the velocity of the displacement, using the viscosity value $D_p$ as a velocity control gain. At this time, the vibration suppression force $F_{cmp}$ is represented by the following Expression (9). Herein, $\overline{K_p^0}$ bar (notation of a horizontal line above the symbol $K_p^0$) is the rigidity value normalized by the coefficient G. $\overline{D_p^0}$ bar is the viscosity value normalized by the coefficient G. The coefficient G is defined by $G = T/x_0$.

[Math. 9]

$$F_{cmp} = (K_p + D_p s)V(x_0,s) = G(\overline{K_p^0} + \overline{D_p^0}s)V(x_0,s) \quad (9)$$

Using Expressions (6) and (9), a characteristic polynomial D(s) represented by the following Expression (10) is obtained.

[Math. 10]

$$D(s) = \overline{D_p^0}\alpha\left(s^3 + \frac{(\overline{K_p^0}\alpha+1)}{\overline{D_p^0}\alpha}s^2 + \omega_{x0}^2 s + \frac{\omega_L^2 + \omega_{x0}^2\overline{K_p^0}\alpha}{\overline{D_p^0}\alpha}\right) \quad (10)$$

The maximum damping ratio $\zeta$ of the vibration suppression device 21 that suppresses the vibration by applying the negative rigidity force changes by adjusting the viscosity value. The maximum damping ratio $\zeta$ is represented by the following Expression (11) as the function of the $K_p^0$ bar which is the normalized negative rigidity value.

[Math. 11]

$$\zeta(\overline{K_p^0}) = \frac{1}{2}\left(\sqrt{1 + \frac{\omega_{x0}^2 - \omega_L^2}{\omega_L^2 + a\overline{K_p^0}\omega_{x0}^2}} - 1\right) \quad (11)$$

Figure 5:
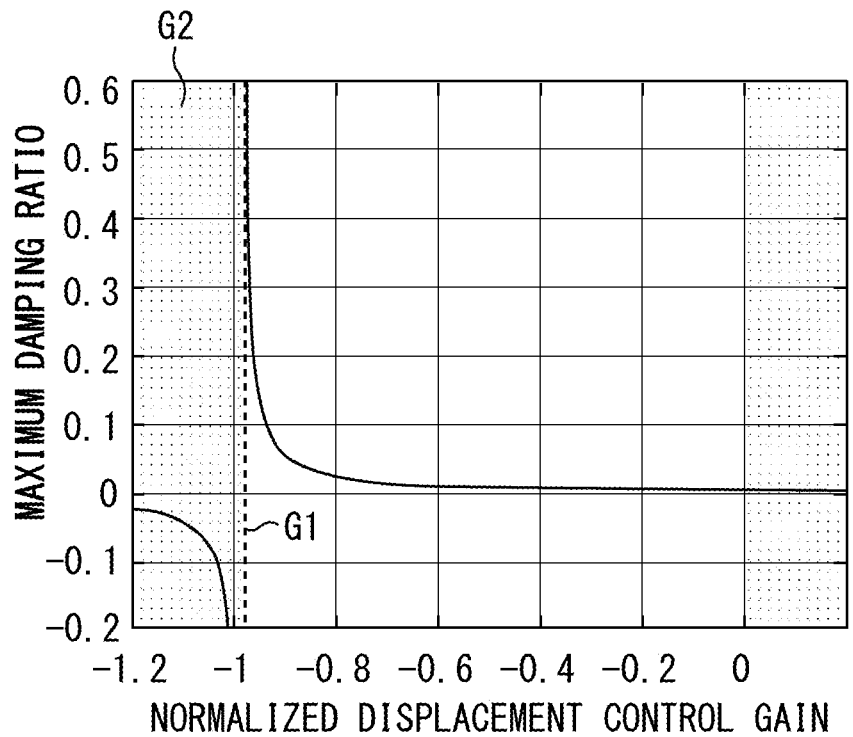
FIG. 5 A diagram illustrating an example of the vibration suppression performance of the vibration suppression device according to Embodiment 1.

FIG. 5 is a graph showing a relationship of Expression (11).

The graph in FIG. 5 indicates the maximum damping ratio $\zeta$ when the ratio $x_0/L$ of the value of the position $x_0$ at which the displacement amplifier 22 is provided to the value of the length L of the vibrating portion of the main rope 8 is 0.01. In FIG. 5, the horizontal axis indicates values of the normalized displacement control gain. The normalized displacement control gain is the rigidity value $K_p^0$ bar normalized by the coefficient G. In FIG. 5, the vertical axis indicates values of the maximum damping ratio $\zeta$. In FIG. 5, a boundary G1 is a boundary between two left and right areas divided by the value of the normalized displacement control gain $K_p^0$ bar. An area G2 is a left-side area with respect to the boundary G1.

As the normalized displacement control gain $K_p^0$ bar approaches the boundary G1 from zero, the absolute value of the $K_p^0$ bar which is a negative value increases. At this time, the value of the maximum damping ratio $\zeta$ increases hyperbolically. Therefore, as the value of the normalized displacement control gain $K_p^0$ bar approaches the value of the boundary G1 from the zero side, the value of the maximum damping ratio $\zeta$ increases. Meanwhile, when the normalized displacement control gain $K_p^0$ bar is on the left side with respect to the boundary G1, the value of the maximum damping ratio $\zeta$ is negative. At this time, the displacement of the main rope 8 becomes unstable by the vibration suppression device 21. The displacement of the main rope 8 becomes unstable when the negative restoring force by the displacement amplifier 22 is greater than the positive restoring force, for example.

The value of the boundary G1 is the value of $K_p^0$ bar at which the maximum damping ratio $\zeta$ is infinite in Expression (11). The value of $K_p^0$ bar at this time is represented as $K_p^{asy}$ bar. $K_p^{asy}$ bar is represented by the following Expression (12).

[Math. 12]

$$\overline{K_p^{asy}} = -\frac{1}{\alpha}\frac{\omega_L^2}{\omega_{x0}^2} = -\frac{L}{L - x_0} \quad (12)$$

Therefore, the value of the normalized displacement control gain $K_p^0$ bar is set in the range represented by the following Expression (13). At this time, the negative restoring force applied to the main rope 8 by the displacement amplifier 22 is smaller than the positive restoring force of the main rope 8.

[Math. 13]

$$-\frac{L}{L - x_0} < \overline{K_p^0} < 0 \quad (13)$$

The range for the displacement control gain $K_p$ represented by the following Expression (14) is obtained by multiplying Expression (13) by the coefficient G.

[Math. 14]

$$-\frac{T}{x_0}\frac{L}{L - x_0} < K_p < 0 \quad (14)$$

As indicated in Expression (14), the value of the boundary of the displacement control gain $K_p^0$ at which the displacement of the main rope 8 becomes unstable may change depending on the tension T and the position $x_0$ of the displacement amplifier 22. Herein, the tension T of the main rope 8 changes depending on the running of the car 9 and the boarding and alighting of users with respect to the car 9.

Subsequently, the operation of the vibration suppression device 21 will be described with reference to FIG. 6 and FIG. 7.

Figure 6:
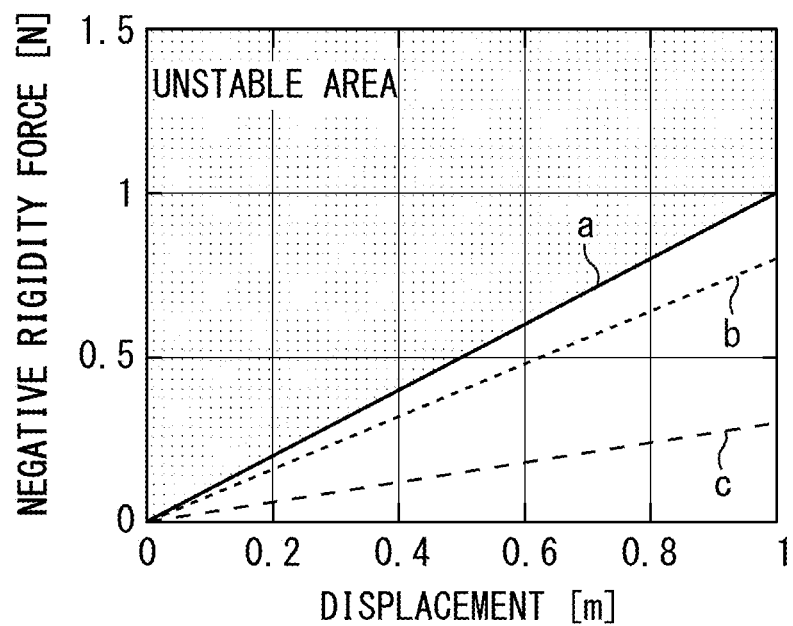
FIG. 6 A figure showing an example of the negative restoring force by the vibration suppression device according to Embodiment 1.
Figure 7:
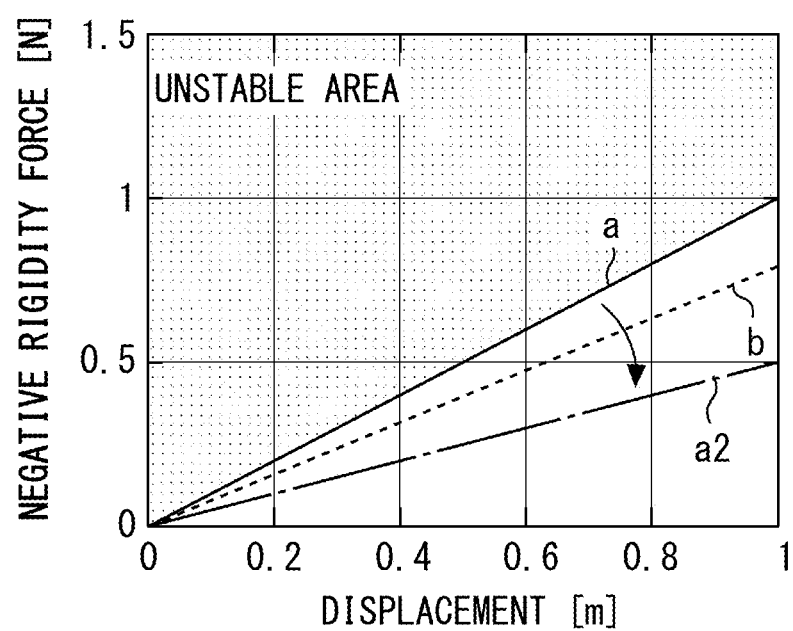
FIG. 7 A figure showing an example of the negative restoring force by the vibration suppression device according to Embodiment 1.

FIG. 6 and FIG. 7 are a figure showing an example of the negative restoring force by the vibration suppression device according to Embodiment 1.

Each graph of FIG. 6 and FIG. 7 indicates the magnitude of the negative restoring force applied as the vibration suppression force by the displacement amplifier 22 under the control of the control unit 24. In each graph, the horizontal axis indicates the magnitude of the displacement in the lateral direction of the main rope 8 at a position at which the displacement amplifier 22 is provided. In each graph, the vertical axis indicates the magnitude of the negative restoring force applied to the main rope 8 by the displacement amplifier 22.

FIG. 6 indicates the negative restoring force in a case where the tension T is applied to the main rope 8. A boundary a in FIG. 6 represents a boundary where the displacement of the main rope 8 becomes unstable. In the graph of FIG. 6, the area above the boundary a represents the unstable area. The unstable area is an area where the magnitude of the negative restoring force is greater than the positive restoring force, for example. The boundary a forms a monotonously increasing straight line with respect to the displacement represented by the following Expression (15). Herein, the magnitude of the negative restoring force is represented as F. The magnitude of the displacement in the lateral direction of the main rope 8 at the position $x_0$ at which the displacement amplifier 22 is provided is represented as Y.

[Math. 15]

$$F = \frac{T}{x_0}\frac{L}{L - x_0}Y \approx \frac{T}{x_0}Y \quad (15)$$

Each of a straight line b and a straight line c in FIG. 6 represents the negative rigidity force which is the negative restoring force to be applied by the vibration suppression device 21 when the value of the displacement control gain $K_p$ is constant. In the straight line b and the straight line c, the respective values of the displacement control gain $K_p$ are set to be different from each other. The absolute value of the displacement control gain $K_p$ in the case of the straight line b is greater than the absolute value of the displacement control gain $K_p$ in the case of the straight line c. The value of the displacement control gain $K_p$ in the case of the straight line b is closer to a lower limit of Expression (13) than the value of the displacement control gain $K_p$ in the case of the straight line c. Therefore, the vibration suppression performance in the case of the straight line b is higher than the vibration suppression performance in the case of the straight line c. Meanwhile, both of the straight line b and the straight line c are outside the unstable area. Therefore, the displacement of the main rope 8 does not become unstable by the vibration suppression device 21.

Meanwhile, FIG. 7 indicates the negative rigidity force in a case where the tension T' different from the tension T of the case of FIG. 6 is applied to the main rope 8. In this example, the tension T' of FIG. 7 is lower than the tension T of FIG. 6. A boundary a2 in FIG. 7 represents a boundary where the displacement of the main rope 8 becomes unstable by the vibration suppression device 21 under the tension T'. When the tension of the main rope 8 is lowered, the positive restoring force becomes small. Therefore, the boundary a2 is positioned below the boundary a. At this time, the negative rigidity force represented by the straight line b falls within the boundary of the unstable area. That is, when a change in the tension of the main rope 8 is not considered, the displacement of the main rope 8 may become unstable.

Therefore, the control unit 24 determines a range of the magnitude of the negative restoring force by the displacement amplifier 22 based on a range of variations in the tension of the main rope 8. The value of the displacement control gain $K_p$ is set to a value in the range of Expression (14) when the tension T is a lower limit value, for example. At this time, the vibration suppression device 21 suppresses the vibration of the main rope 8 as follows, for example.

When the main rope 8 vibrates, the displacement measurement unit 23 measures the displacement in the lateral direction of the main rope 8. The displacement measurement unit 23 outputs the measured displacement to the control unit 24. The control unit 24 calculates the value of the negative rigidity force to be applied as the vibration suppression force, based on the set value of the displacement control gain $K_p$ and the displacement input from the displacement measurement unit 23. The magnitude of the negative rigidity force at this time is smaller than the lower limit of the positive restoring force with respect to the displacement. Here, the lower limit of the positive restoring force is predetermined according to the range of variations in the tension of the main rope 8. The control unit 24 outputs an instruction value of the calculated negative rigidity force to the displacement amplifier 22. The displacement amplifier 22 applies the vibration suppression force to the main rope 8 based on the instruction value input from the control unit 24. The vibration of the main rope 8 is suppressed by the vibration suppression force applied from the displacement amplifier 22.

As described above, the vibration suppression device 21 according to Embodiment 1 includes the first displacement measurement unit, the first displacement amplifier, and the control unit 24. The first displacement measurement unit measures the displacement in the lateral direction of the rope-like body due to the vibration about the equilibrium position 20 at the first position P1 in the longitudinal direction of the rope-like body of the elevator 1. The first displacement amplifier applies, to the rope-like body, the negative restoring force that amplifies the displacement of the rope-like body. The control unit 24 causes the first displacement amplifier to apply the negative restoring force smaller than the positive restoring force, based on the displacement measured by the first displacement measurement unit. The positive restoring force is a force to return the rope-like body to the equilibrium position 20.

The vibration suppression device 21 suppresses the vibration of the rope-like body by amplifying the displacement of the rope-like body using the negative restoring force applied by the first displacement amplifier. The control unit 24 controls the magnitude of the negative restoring force to be applied by the first displacement amplifier to fall within a range smaller than the positive restoring force, based on the displacement measured by the first displacement measurement unit. This makes it possible to use the negative restoring force that amplifies the displacement of the rope-like body of the elevator 1 to prevent the displacement from becoming unstable.

The control unit 24 causes the first displacement amplifier to apply the negative restoring force smaller than the lower limit of the positive restoring force. The lower limit of the positive restoring force is predetermined according to the range of variations in the tension of the rope-like body. This makes it possible to use the negative restoring force that amplifies the displacement of the rope-like body of the elevator 1 to prevent the displacement from becoming unstable, even when the tension of the rope-like body varies. The control unit 24 may cause the displacement amplifier 22 to apply a nonlinear negative restoring force with respect to the displacement.

Note that the displacement amplifier 22 may apply the vibration suppression force to the main rope 8 without contact with the rope-like body. It is only required that the vibration suppression force is a variable force based on the control of the control unit 24. For example, when the main rope 8 has s ferromagnetic property, the displacement amplifier 22 may apply the vibration suppression force to the main rope 8 by the magnetic force of an electromagnet with variable magnetic field strength or a permanent magnet movable relative to the main rope 8, for example.

Note that the vibration suppression device 21 may be provided in the upper portion of the car 9. The vibration suppression device 21 is provided in a car frame, for example. When the rope-like body is wrapped around the sheave provided in the pit 6, for example, the vibration suppression device 21 may be arranged in the pit 6. Note that, when the elevator 1 does not have the machine room 4, the traction machine 7 is provided in the upper portion or the lower portion of the hoistway 3, for example. At this time, the vibration suppression device 21 may be provided at a position closer to the traction machine 7 than to the antinode.

Subsequently, a modification of Embodiment 1 will be described with reference to FIG. 8 and FIG. 9.

Figure 8:
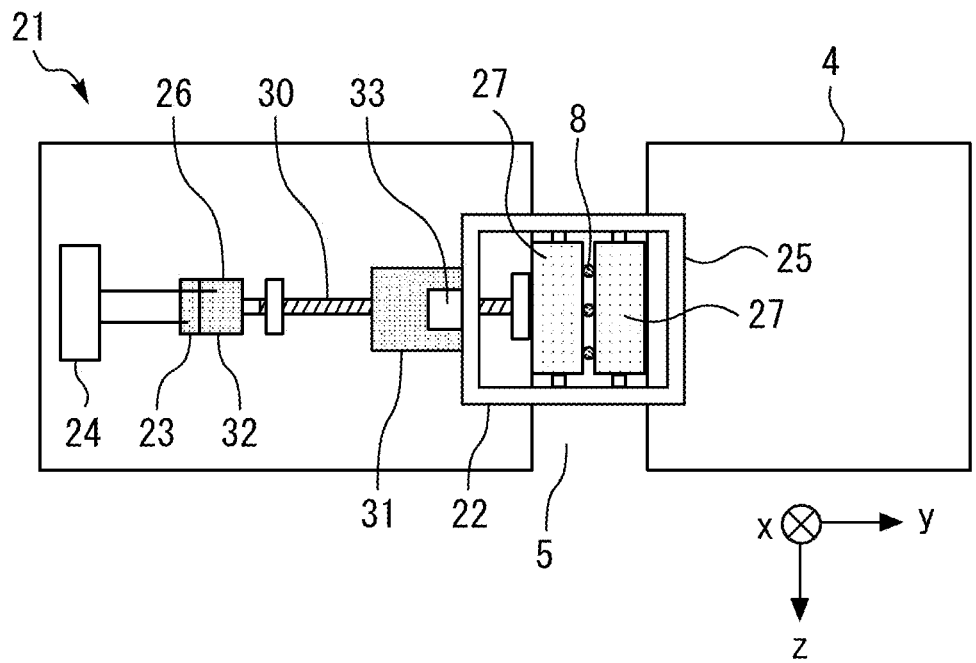
FIG. 8 A configuration diagram of a vibration suppression device according to the modification of Embodiment 1.
Figure 9:
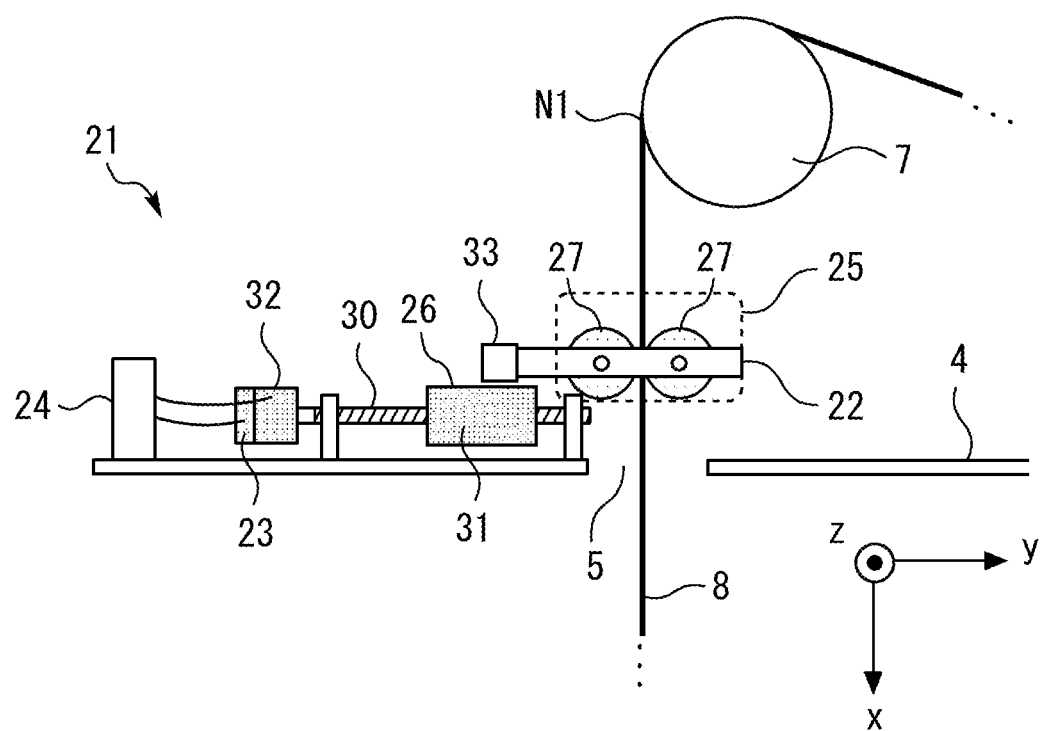
FIG. 9 A configuration diagram of a vibration suppression device according to the modification of Embodiment 1.

FIG. 8 and FIG. 9 are a configuration diagram of a vibration suppression device according to the modification of Embodiment 1.

FIG. 8 is a figure illustrating a vibration suppression device 21 when viewed from the top. An actuator 26 of a displacement amplifier 22 includes a ball screw 30, a nut 31, and a motor 32. The ball screw 30 is arranged with a long axis facing a main rope 8. The nut 31 is passed around the ball screw 30 to be movable in the direction of the long axis of the ball screw 30 by rotation about the long axis of the ball screw 30. The nut 31 is connected to a contact portion 25. The motor 32 is a device for rotationally driving the ball screw 30. The actuator 26 causes the motor 32 to rotate the ball screw 30 to move the contact portion 25 together with the nut 31. Thus, the actuator 26 applies the vibration suppression force to the main rope 8 through the contact portion 25. The displacement measurement unit 23 may be a rotary encoder provided in the motor 32, for example.

FIG. 9 is a figure illustrating the vibration suppression device 21 when viewed from the direction parallel to the z-axis. The vibration suppression device 21 includes a force sensor 33. The force sensor 33 is provided in a connection portion between the nut 31 and the contact portion 25. The force sensor 33 is a device for measuring a reaction force from a rope-like body such as the main rope 8. The force sensor 33 outputs the measured reaction force to a control unit 24. In this way, the control unit 24 can obtain the vibration of the main rope 8 more accurately even when the reaction force of the main rope 8 is not transmitted to the motor 32 due to the friction between the ball screw 30 and the nut 31 or the like.

Subsequently, another modification of Embodiment 1 will be described with reference to FIG. 10.

Figure 10:
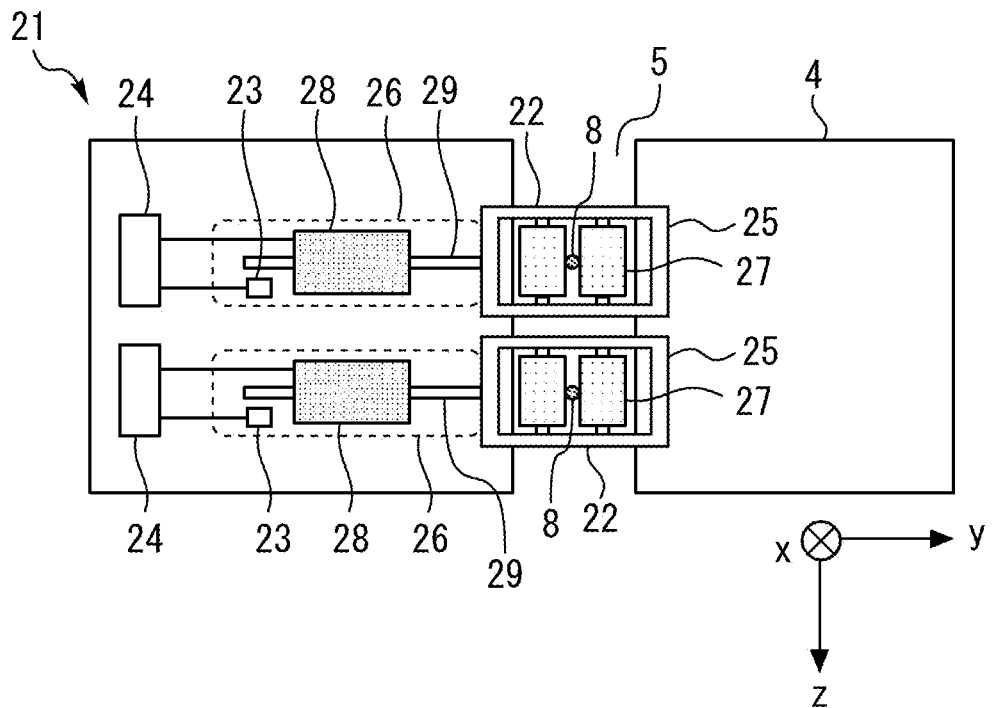
FIG. 10 A configuration diagram of a vibration suppression device according to the modification of Embodiment 1.

FIG. 10 is a configuration diagram of a vibration suppression device according to the modification of Embodiment 1.

FIG. 10 is a figure illustrating a vibration suppression device 21 when viewed from the top. For example, when the elevator 1 includes a plurality of main ropes 8, a plurality of vibration suppression devices 21 may be provided independently for the respective main ropes 8. At this time, each of the plurality of vibration suppression devices 21 suppresses the vibration by applying the vibration suppression force to any one of the plurality of the main ropes 8. When there is dispersion in the tension of the plurality of main ropes 8, dispersion may occur in the normal restoring force among the main ropes 8. Also in this case, the vibration suppression device 21 can suppress the vibration more effectively, based on the positive restoring force of each of the plurality of main ropes 8.

Subsequently, an example of a hardware configuration of the control unit 24 will be described with reference to FIG. 11.

Figure 11:
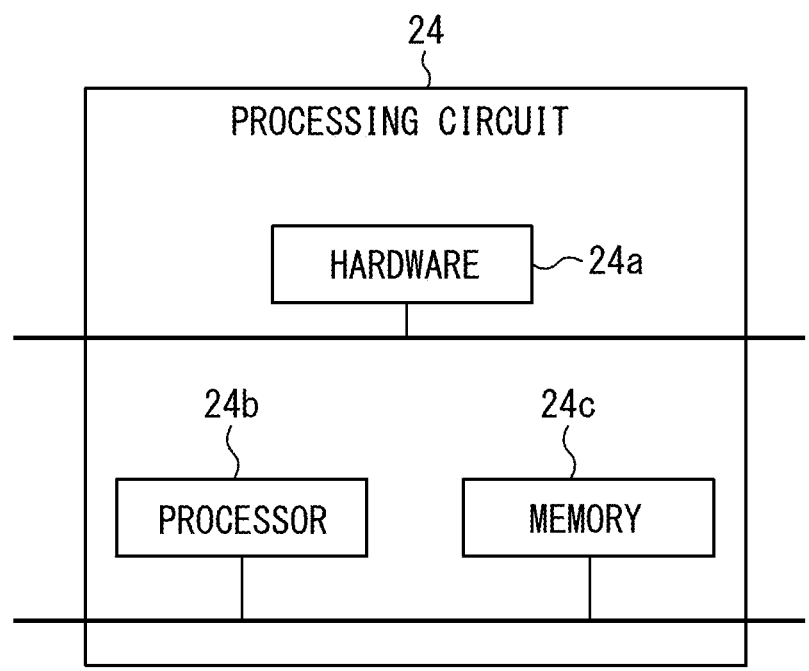
FIG. 11 A hardware configuration diagram of a main part of the control unit according to Embodiment 1.

FIG. 11 is a hardware configuration diagram of a main part of the control unit according to Embodiment 1.

Each function of the control unit 24 can be implemented by a processing circuit. The processing circuit includes at least one processor 24b and at least one memory 24c. The processing circuit may include at least one piece of dedicated hardware 24a in addition to or instead of the processor 24b and the memory 24c.

When the processing circuit includes the processor 24b and the memory 24c, each function of the control unit 24 is implemented by software, firmware, or a combination of software and firmware. At least one of software and firmware is described as a program. The program is stored in the memory 24c. The processor 24b implements each function of the control unit 24 by reading and executing the program stored in the memory 24c.

The processor 24b is also referred to as a central processing unit (CPU), a processing unit, an arithmetic operation unit, a microprocessor, a microcomputer, or a DSP. The memory 24c includes, for example, a nonvolatile or volatile semiconductor memory, such as RAM, ROM, flash memory, EPROM, or EEPROM.

When the processing circuit includes the dedicated hardware 24a, the processing circuit is implemented by, for example, a single circuit, a composite circuit, a programmed processor, a parallel-programmed processor, an ASIC, an FPGA, or a combination thereof.

Each function of the control unit 24 can be respectively implemented by a processing circuit. Alternatively, each of the functions of the control unit 24 can be collectively implemented by a processing circuit. As a further alternative, some of the functions of the control unit 24 may be implemented by the dedicated hardware 24a and the other functions may be implemented by software or firmware. In this way, the processing circuit implements each function of the control unit 24 using the hardware 24a, software, firmware, or a combination thereof.

Embodiment 2

In Embodiment 2, points different from those in the examples disclosed in Embodiment 1 will be described in particular detail. Any feature of the examples disclosed in Embodiment 1 may be adopted for features which are not described in Embodiment 2.

The possibility of a deterioration in the vibration suppression performance of a vibration suppression device due to variations in tension of a rope-like body will be described with reference to FIG. 12.

Figure 12:
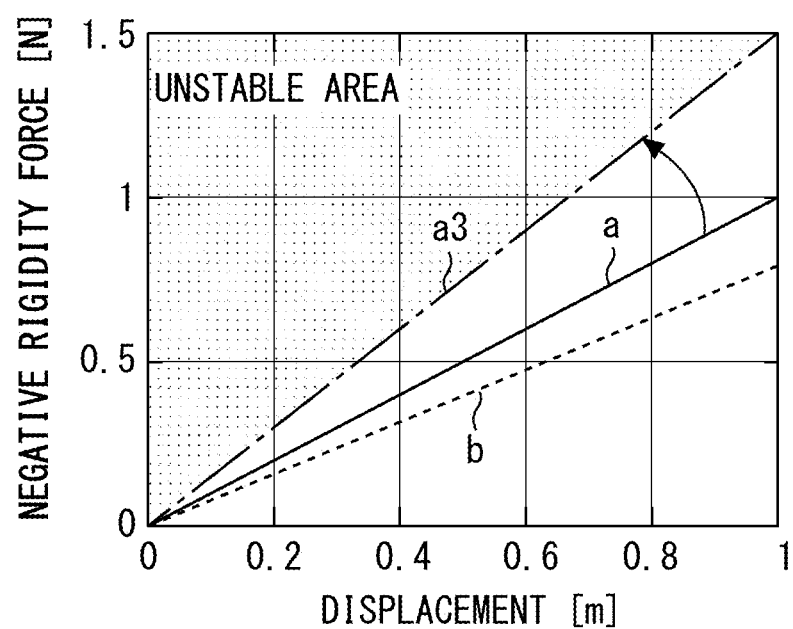
FIG. 12 A figure showing an example of a negative restoring force by the vibration suppression device that amplifies the displacement of the rope-like body.

FIG. 12 is a figure showing an example of a negative restoring force by the vibration suppression device that amplifies the displacement of the rope-like body.

The graph of FIG. 12 indicates the magnitude of the negative rigidity force which is the negative restoring force applied as the vibration suppression force to the main rope 8 by the displacement amplifier under the control of the control unit in the same manner as in the graphs of FIG. 6 and FIG. 7. FIG. 12 indicates the negative rigidity force in a case where the tension T' different from the tension T of the case of FIG. 6 is applied to the main rope 8. In this example, the tension T' of FIG. 12 is higher than the tension T of FIG. 6. A boundary a3 in FIG. 12 represents a boundary where the displacement of the main rope 8 becomes unstable under the tension T'. When the tension of the main rope 8 increases, the positive restoring force of the main rope 8 increases. Therefore, the boundary a3 is positioned above the boundary a. At this time, the negative rigidity force represented by the straight line b is farther away from the boundary of the unstable area. That is, in the vibration suppression device in which the control unit responds regardless of the tension of the main rope 8, the vibration suppression performance of the vibration suppression device may deteriorate due to a change in the tension of the main rope 8.

Therefore, the control unit 24 of the vibration suppression device 21 according to Embodiment 2 changes the response to the displacement according to the change in tension of the main rope 8. The control unit 24 changes the negative rigidity force which is the negative restoring force, by updating the control gain, for example. Here, the control gain includes a displacement control gain and a velocity control gain.

Subsequently, a configuration of the vibration suppression device 21 will be described.

Figure 13:
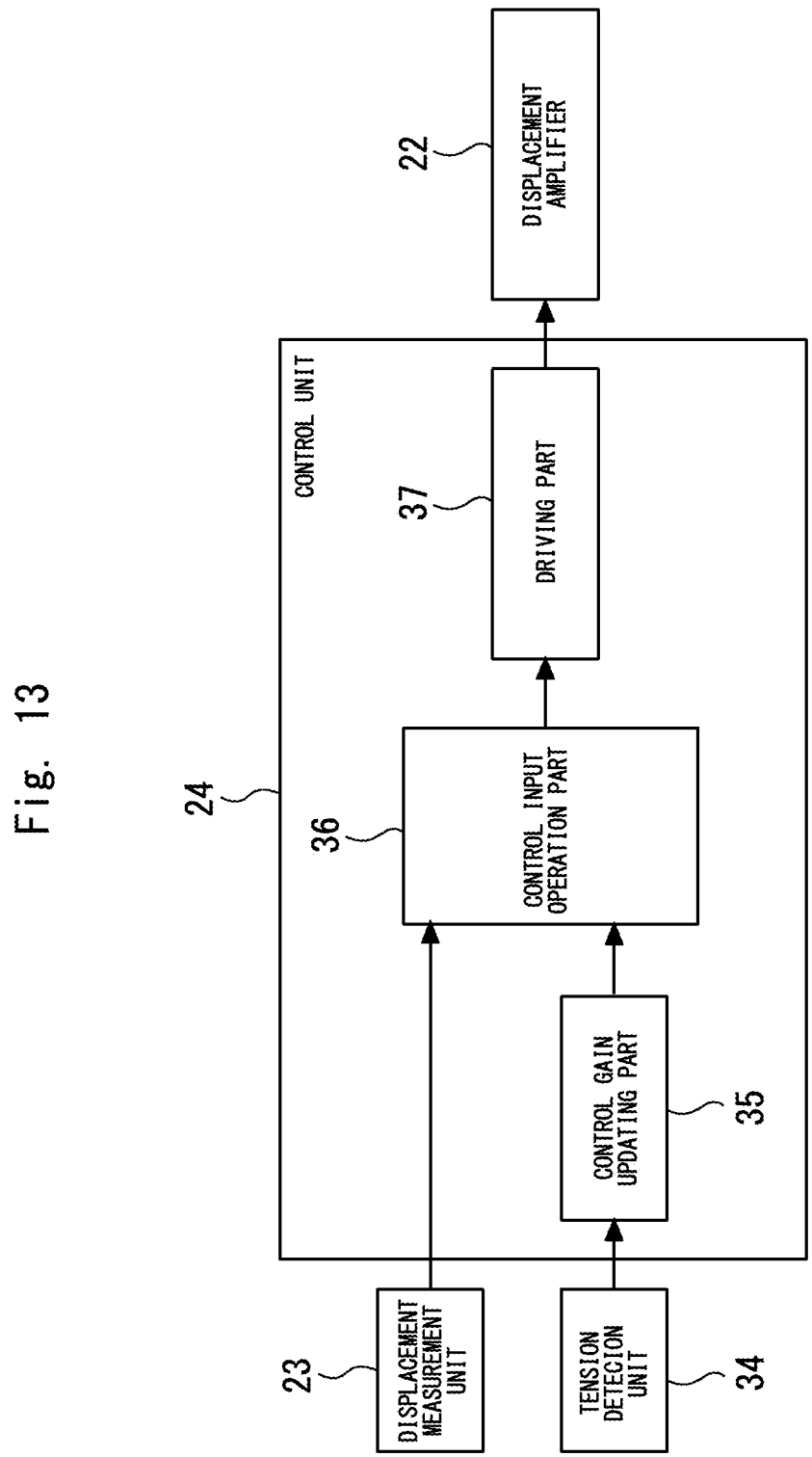
FIG. 13 A configuration diagram illustrating a configuration of the vibration suppression device according to Embodiment 2.

FIG. 13 is a configuration diagram illustrating a configuration of the vibration suppression device according to Embodiment 2.

The vibration suppression device 21 includes a tension detection unit 34. The tension detection unit 34 is a device for detecting tension of the rope-like body such as the main rope 8. The tension detection unit 34 outputs the detected tension to a control unit 24.

The control unit 24 causes a displacement amplifier 22 to apply the negative restoring force to the main rope 8 within a range smaller than the positive restoring force determined according to the tension, based on the tension input from the tension detection unit 34. In this example, the control unit 24 causes the displacement amplifier 22 to apply the negative rigidity force as the negative restoring force, for example. The control unit 24 includes a control gain updating part 35, a control input operation part 36, and a driving part 37.

The control gain updating part 35 is a part configured to update a control gain determining the magnitude of the vibration suppression force according to the tension of the rope-like body. The control gain updating part 35 accepts the input of the tension from the tension detection unit 34.

The control gain updating part 35 updates a control gain as follows, for example.

As indicated in Expression (12) and Expression (13), as the normalized displacement control gain is closer to $K_p^{asy}$ bar in the range where the displacement of the rope-like body does not become unstable, the vibration suppression performance is improved. Therefore, the control gain updating part 35 updates the control gain such that the normalized displacement control gain is maintained constant. The normalized displacement control gain is determined based on the target vibration suppression performance, for example. The index of the target vibration suppression performance is, for example, a damping ratio. Therefore, the normalized displacement control gain $K_p^0$ bar corresponding to the target damping ratio is determined based on Expression (11) or the like, for example. Meanwhile, the coefficient G normalizing the control gain includes the tension T. Therefore, the displacement control gain $K_p$ when the tension T is being applied to the main rope 8 is represented by the following Expression (16).

[Math. 16]

$$K_p = G\overline{K_p^0} = \frac{T}{x_0}\overline{K_p^0} \tag{16}$$

The normalized velocity control gain $D_p^0$ bar is given by the following Expression (17) such that the vibration suppression performance is improved with respect to the set normalized displacement control gain $K_p^0$ bar.

[Math. 17]

$$\overline{D_p^0} = \frac{1}{\alpha}\sqrt{\frac{\sqrt{X}}{\omega_{x0}}\cdot\frac{\omega_L^2 + \alpha\overline{K_p^0}\omega_{x0}^2 + \left(1 + \alpha\overline{K_p^0}\right)\frac{\omega_{x0}}{\sqrt{X}}}{\omega_{x0}^2 + \frac{\omega_{x0}}{\sqrt{X}}}} \tag{17}$$

It should be noted that X represented by the following Expression (18) is used in Expression (17) for simplification.

[Math. 18]

$$X = \frac{\alpha\overline{K_p^0} + 1}{\omega_L^2 + \omega_{x0}^2\alpha\overline{K_p^0}} \tag{18}$$

The normalized velocity control gain $D_p^0$ bar does not depend on the tension T. Therefore, the value of $D_p^0$ bar is determined according to the value of $K_p^0$ bar. Therefore, when the normalized control gain is maintained constant, the displacement control gain $K_p'$ and velocity control gain $D_p'$ when the tension is changed to T' are represented by the following Expression (19).

[Math. 19]

$$K_p' = \frac{T'}{x_0}\overline{K_p^0},\ D_p' = \frac{T'}{x_0}\overline{D_p^0} \tag{19}$$

The control input operation part 36 is a part configured to calculate an instruction value of the vibration suppression force to be applied to the rope-like body by the displacement amplifier 22. The control input operation part 36 accepts the input of the updated control gain from the control gain updating part 35. The control input operation part 36 accepts the input of the displacement from the displacement measurement unit 23. The control input operation part 36 calculates the instruction value of the vibration suppression force based on the accepted inputs of the control gain and the displacement. The control input operation part 36 outputs the calculated instruction value to the driving part 37.

The driving part 37 is a part configured to generate an instruction signal of the vibration suppression force to be output to the displacement amplifier 22. The driving part 37 accepts the input of the instruction value from the control input operation part 36. The driving part 37 generates the instruction signal to be output to the displacement amplifier 22 based on the input instruction value. The driving part 37 outputs the generated instruction signal to the displacement amplifier 22. The displacement amplifier 22 applies the vibration suppression force to the main rope 8 based on the instruction signal input from the driving part 37.

Figure 14:
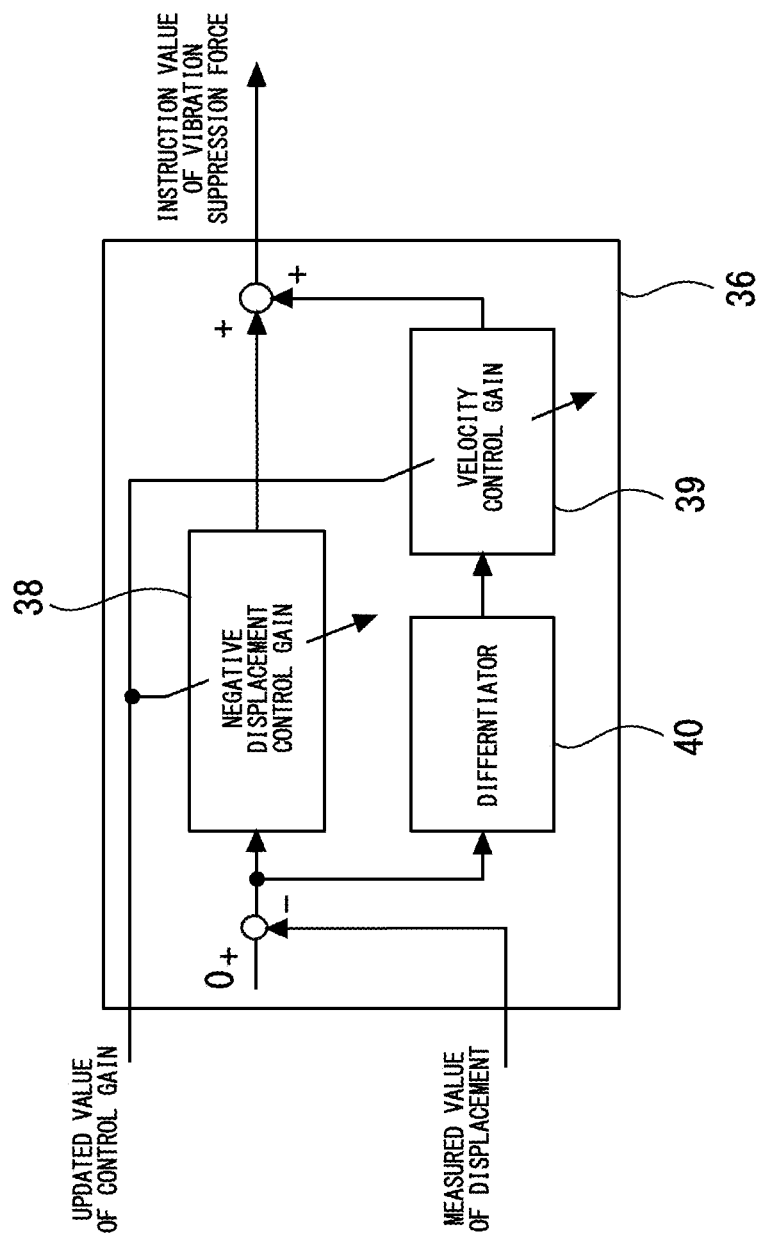
FIG. 14 A block diagram illustrating a configuration of the control input operation part according to Embodiment 2.

FIG. 14 is a block diagram illustrating a configuration of the control input operation part according to Embodiment 2.

The control input operation part 36 includes a displacement feedback arithmetic operator 38, a velocity feedback arithmetic operator 39, and a differentiator 40. The displacement feedback arithmetic operator 38 updates the value of the displacement control gain by the control gain input from the control gain updating part 35. The velocity feedback arithmetic operator 39 updates the value of the velocity control gain by the control gain input from the control gain updating part 35. The deviation from the steady state in the displacement input from the displacement measurement unit 23 is input to the displacement feedback arithmetic operator 38. Here, the displacement in the steady state is, for example, zero. The displacement feedback arithmetic operator 38 calculates the instruction value of the negative rigidity force based on the input deviation of the displacement and the updated displacement control gain. The deviation from the steady state in the displacement input from the displacement measurement unit 23 is input to the differentiator 40. The differentiator 40 calculates the velocity of the displacement by differentiation of the displacement. The differentiator 40 inputs the calculated velocity of the displacement to the velocity feedback arithmetic operator 39. The velocity feedback arithmetic operator 39 calculates the instruction value of the viscous force based on the input velocity of the displacement and the updated velocity control gain. The calculated instruction values of the negative rigidity force and the viscous force are added as the instruction value of the vibration suppression force. The instruction value of the vibration suppression force thus calculated is output to the driving part 37.

Subsequently, the operation of the vibration suppression device 21 will be described with reference to FIG. 15.

Figure 15:
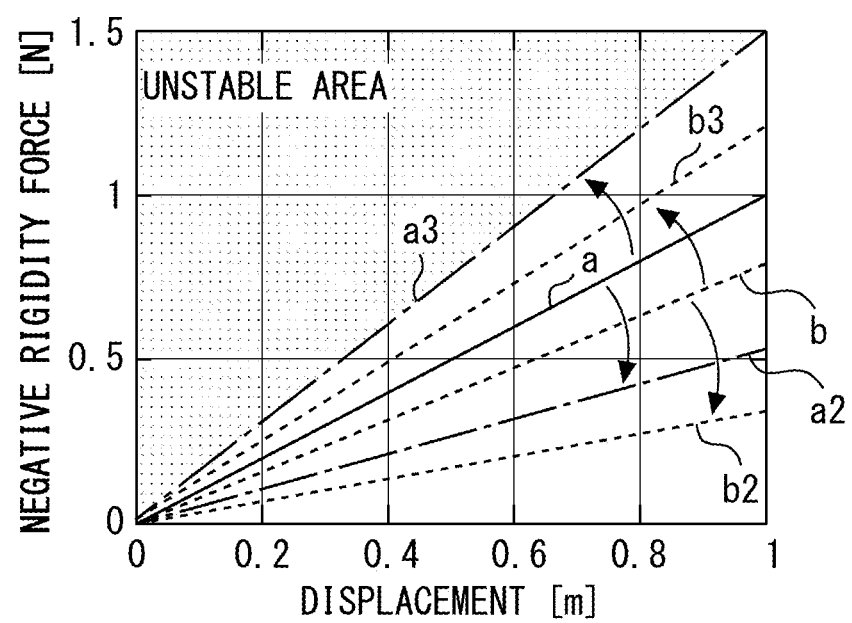
FIG. 15 A figure showing an example of the negative restoring force by the vibration suppression device according to Embodiment 2.

FIG. 15 is a figure showing an example of the negative restoring force by the vibration suppression device according to Embodiment 2.

The graph of FIG. 15 indicates the magnitude of the negative rigidity force which is the negative restoring force applied by the displacement amplifier 22 under the control of the control unit 24 in the same manner as in the graph of FIG. 12. In FIG. 15, when the tension of the main rope 8 increases from T to T', the unstable boundary changes from a to a3. At this time, the control gain updating part 35 updates the control gain according to the tension such that the normalized displacement control gain is maintained constant. Here, when the control gain is not updated, the negative rigidity force responds as in the straight line b in the graph according to the displacement. Meanwhile, in the vibration suppression device 21 of Embodiment 2, the control gain is updated. Therefore, the negative rigidity force responds as in the straight line b3 according to the displacement. In this way, since the control gain is dynamically updated according to the tension of the main rope 8, the vibration suppression performance of the vibration suppression device 21 is prevented from deteriorating due to a change in the tension of the main rope 8.

In FIG. 15, when the tension of the main rope 8 is lower than T, the unstable boundary changes from a to a2. At this time, the control gain updating part 35 updates the control gain according to the tension such that the normalized displacement control gain is maintained constant, in the same manner as when the tension of the main rope 8 increases. When the normalized displacement control gain set within the range of the stable area is constant, the negative restoring force by the displacement amplifier 22 does not exceed the positive restoring force. In this way, since the control gain is dynamically updated according to the tension of the main rope 8, the vibration suppression by the vibration suppression device 21 is prevented from becoming unstable due to a change in the tension of the main rope 8.

Subsequently, a modification of Embodiment 2 will be described with reference to FIG. 16.

Figure 16:
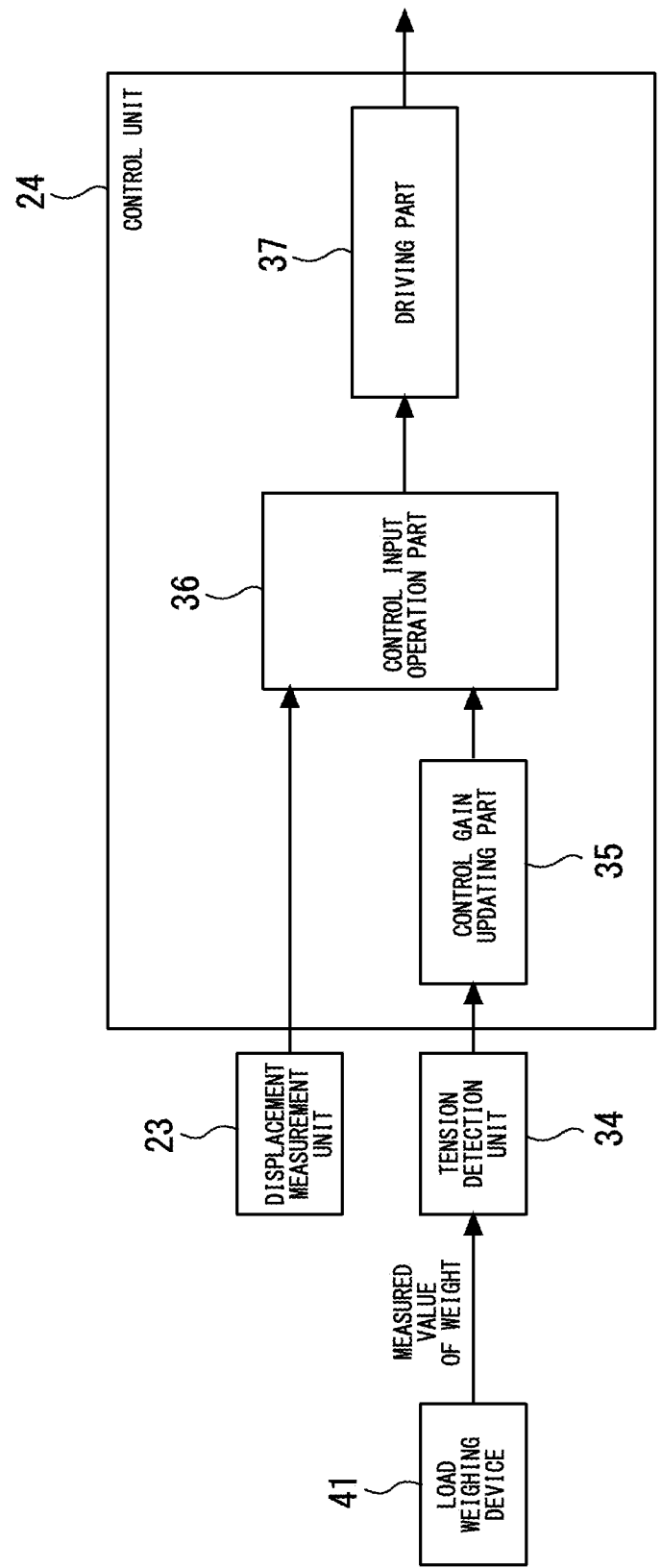
FIG. 16 A block diagram illustrating the modification of the vibration suppression device according to Embodiment 2.

FIG. 16 is a block diagram illustrating the modification of the vibration suppression device according to Embodiment 2.

In this example, the elevator 1 includes a load weighing device 41. The load weighing device 41 is a device configured to measure the weight of a car 9. The load weighing device 41 is provided in the car 9. The weight of the car 9 varies depending on the boarding and alighting of passengers, for example. The load weighing device 41 outputs a signal representing the measured weight to the outside.

Here, the tension of the main rope 8 depends on the weight of the car 9. Therefore, in this example, the tension detection unit 34 detects the tension of the main rope 8 based on the signal input from the load weighing device 41.

Subsequently, another modification of Embodiment 2 will be described with reference to FIG. 17.

Figure 17:
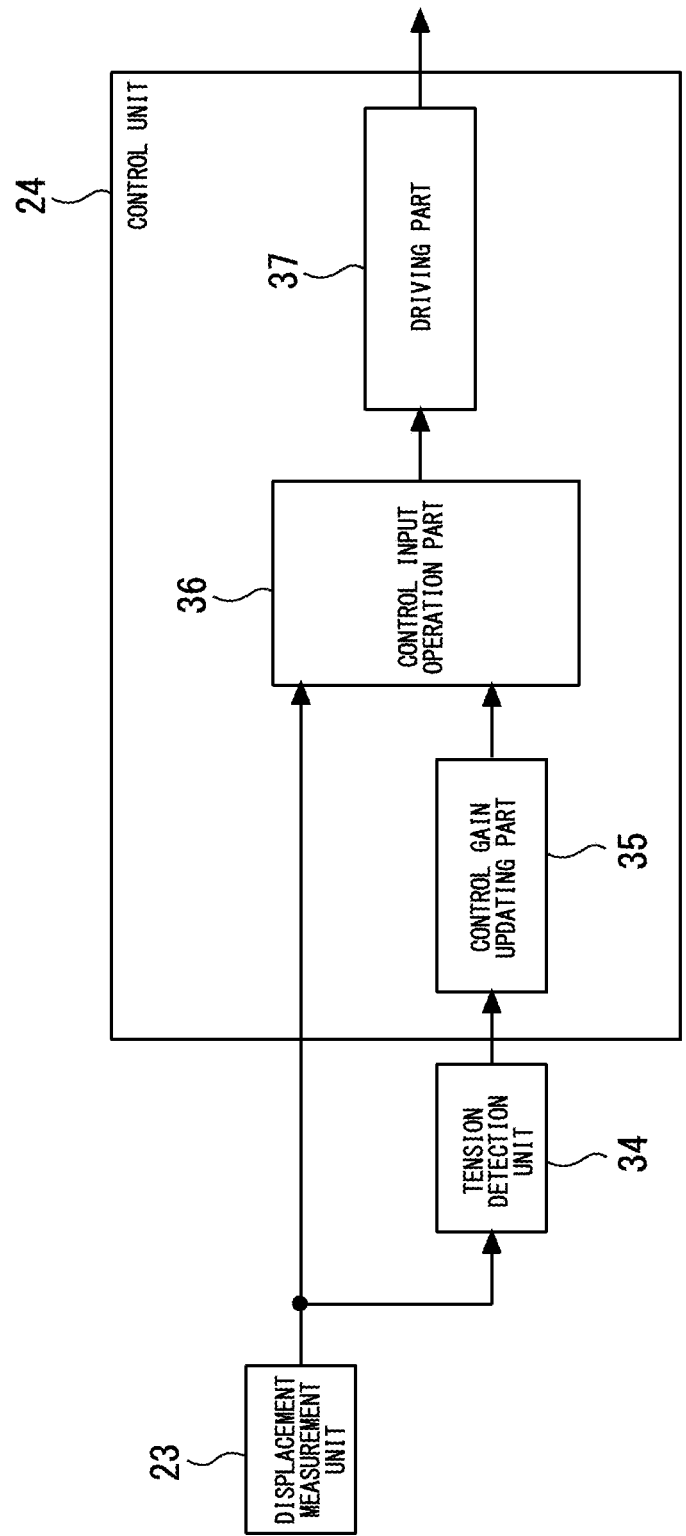
FIG. 17 A block diagram illustrating the modification of the vibration suppression device according to Embodiment 2.

FIG. 17 is a block diagram illustrating the modification of the vibration suppression device according to Embodiment 2.

In this example, the tension detection unit 34 accepts the input of the displacement measured by the displacement measurement unit 23. The tension detection unit 34 detects the tension of the main rope 8 based on the input displacement. The tension detection unit 34 detects the tension based on a physical model of the vibration of the main rope 8, for example. The tension detection unit 34 may detect the tension using the method based on the identification theory identifying the parameters of the physical model, for example.

As described above, the vibration suppression device 21 according to Embodiment 2 includes the tension detection unit 34. The tension detection unit 34 detects the tension of the rope-like body. The control unit 24 causes the first displacement amplifier to apply the negative restoring force smaller than the positive restoring force, based on the tension detected by the tension detection unit 34. The positive restoring force is determined according to the tension.

The control unit 24 controls the magnitude of the negative restoring force according to the tension. This makes it possible to use the negative restoring force that amplifies the displacement of the rope-like body of the elevator 1 to prevent the displacement from becoming unstable, even when the tension of the rope-like body varies. Note that the control unit 24 may cause the displacement amplifier 22 to apply a nonlinear negative restoring force with respect to the displacement.

The tension detection unit 34 detects the tension of the rope-like body based on the weight measured by the load weighing device 41 of the elevator 1.

The tension of the main rope 8 which is an example of the rope-like body varies depending on the weight of the car 9. Therefore, the tension detection unit 34 can detect the tension of the main rope 8 based on a direct measurement. For example, when the tension is applied to the rope-like body by the sheave or the like, the elevator 1 may include the load weighing device for measuring the weight of the sheave. In this case, the tension detection unit 34 may detect the tension of the rope-like body based on the weight measured by the load weighing device.

The tension detection unit 34 detects the tension of the rope-like body based on the displacement measured by the first displacement measurement unit.

Therefore, the vibration suppression device 21 does not require addition of new hardware for detecting the tension.

The control unit 24 updates the magnitude of the negative displacement control gain based on the tension detected by the tension detection unit 34. The control unit 24 causes the first displacement amplifier to apply, as the negative restoring force, the negative rigidity force based on the negative displacement control gain and the displacement.

Thus, the control unit 24 can control the magnitude of the negative restoring force according to the tension without requiring complicated calculations.

Additionally, the control unit 24 causes the first displacement amplifier to apply the negative rigidity force based on the displacement control gain $K_p$ obtained from the equation (16) by the normalized displacement control gain $\bar{K}_p^0$ bar satisfying the inequality (13). Note that in Expression (13) and Expression (16), the distance from the node of the vibration to a position at which the first displacement amplifier is arranged is represented as $x_0$. The length of the vibrating portion of the rope-like body is represented as L. The tension of the rope-like body is represented as T.

In this way, the vibration suppression device 21 can suppress an unstable displacement of the rope-like body even when the tension varies. Even when the tension varies, the vibration suppression device 21 can maintain the set vibration suppression performance.

The control unit 24 detects the velocity of the displacement based on the displacement measured by the first displacement measurement unit. The control unit 24 updates the magnitude of the velocity control gain based on the tension detected by the tension detection unit 34. The control unit 24 causes the first displacement amplifier to apply, to the rope-like body, the viscous force in the lateral direction based on the velocity control gain and the velocity.

Even when the tension varies, the viscous force is updated according to the varying tension. Thus, the vibration is more effectively suppressed by the vibration suppression device 21.

Note that the velocity control gain may be a fixed value. The vibration suppression force does not necessarily contain the component of the viscous force.

Embodiment 3

In Embodiment 3, points different from those in the examples disclosed in Embodiment 1 or Embodiment 2 will be described in particular detail. Any feature of the examples disclosed in Embodiment 1 or Embodiment 2 may be adopted for features which are not described in Embodiment 3.

Figure 18:
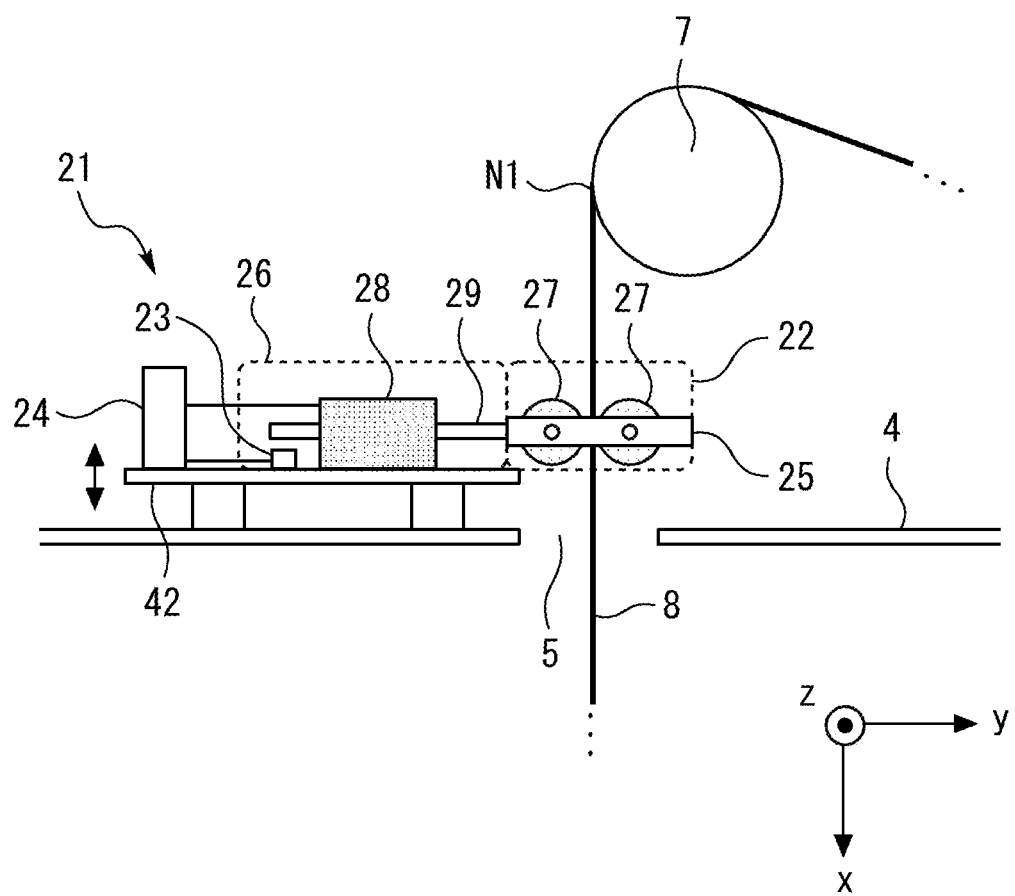
FIG. 18 A configuration diagram of the vibration suppression device according to Embodiment 3.

FIG. 18 is a configuration diagram of the vibration suppression device according to Embodiment 3.

The vibration suppression device 21 changes the response to the displacement of the rope-like body by moving the displacement measurement unit 23 and the displacement amplifier 22 in the longitudinal direction of the rope-like body according to the tension of the rope-like body. At this time, the control unit 24 does not necessarily update the control gain.

FIG. 18 is a figure illustrating the vibration suppression device 21 when viewed from the direction parallel to the z-axis. The vibration suppression device 21 includes a movable mechanism 42. The movable mechanism 42 is a mechanism for moving positions of the displacement measurement unit 23 and the displacement amplifier 22 along the longitudinal direction of the rope-like body such as the main rope 8. Examples of the movable mechanism 42 include a movable stage on which the displacement measurement unit 23 and the displacement amplifier 22 are placed. The movable mechanism 42 moves the displacement measurement unit 23 and the displacement amplifier 22 while maintaining the relative positional relationship in the lateral direction among the displacement measurement unit 23, the displacement amplifier 22, and the main rope 8, for example.

The control unit 24 causes the movable mechanism 42 to move the positions of the displacement measurement unit 23 and the displacement amplifier 22, based on the tension detected by the tension detection unit 34. For example, when the tension of the main rope 8 changes from T to T', the control unit 24 moves the positions of the displacement measurement unit 23 and the displacement amplifier 22 from $x_0$ to $x_0'$ by the following Expression (20).

[Math. 20]

$$x_0' = x_0 \frac{T'}{T} \quad (20)$$

In this way, the normalized displacement control gain $\bar{K_p^0}$ bar is maintained constant regardless of updating of the displacement control gain $K_p$, even when the tension of the rope-like body changes. The vibration suppression device 21 can suppress an unstable displacement of the rope-like body even when the tension varies. Even when the tension varies, the vibration suppression device 21 can maintain the set vibration suppression performance.

Note that the movable mechanism 42 may move the positions in the longitudinal direction of the displacement measurement unit 23 and the displacement amplifier 22 among the positions of a plurality of discrete stages. At this time, the control unit 24 may update the control gain such that the normalized displacement control gain $\bar{K_p^0}$ bar is maintained constant, for example, according to stages of the positions of the displacement measurement unit 23 and the displacement amplifier 22.

Subsequently, a modification of Embodiment 3 will be described with reference to FIG. 19.

Figure 19:
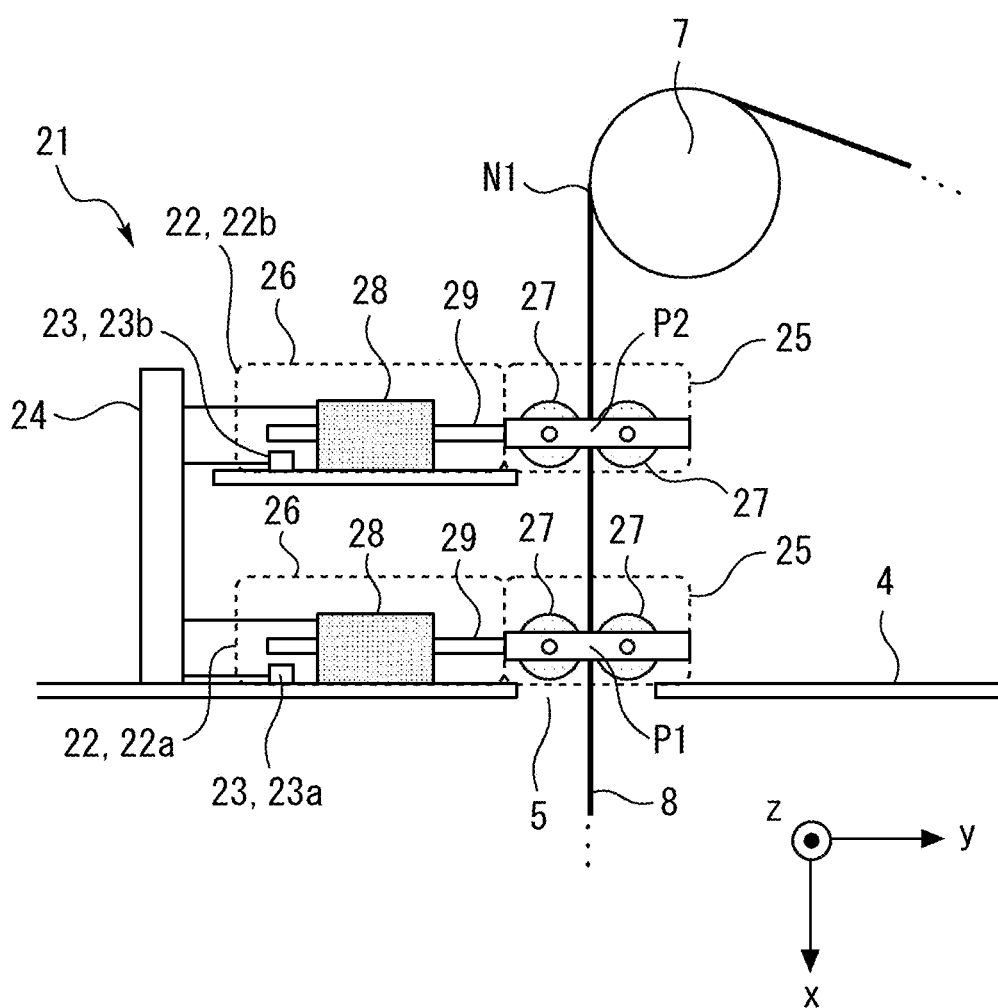
FIG. 19 A configuration diagram of a vibration suppression device according to the modification of Embodiment 3.

FIG. 19 is a configuration diagram of a vibration suppression device according to the modification of Embodiment 3.

The vibration suppression device 21 includes two sets of the displacement measurement unit 23 and the displacement amplifier 22. The two sets of the displacement measurement unit 23 and the displacement amplifier 22 have the same configuration as each other, for example. One set of the displacement measurement unit 23 and the displacement amplifier 22 is arranged at a first position P1 in the longitudinal direction of the main rope 8. The other set of the displacement measurement unit 23 and the displacement amplifier 22 is arranged at a second position P2 in the longitudinal direction of the main rope 8. The second position P2 is a position different from the first position P1 in the longitudinal direction of the rope-like body such as the main rope 8. In this example, the second position P2 is a position closer to the node than to the first position P1. A displacement measurement unit 23a and a displacement amplifier 22a that are arranged at the first position P1 are examples of the first displacement measurement unit and the first displacement amplifier, respectively. A displacement measurement unit 23b and a displacement amplifier 22b that are arranged at the second position P2 are examples of the second displacement measurement unit and the second displacement amplifier, respectively.

The control unit 24 selects one of the first displacement amplifier or the second displacement amplifier, based on the tension detected by the tension detection unit 34. The control unit 24 selects the displacement amplifier 22 arranged at a position closer to $x_0'$ calculated by Expression (20), for example. The control unit 24 causes the selected displacement amplifier 22 to apply the negative restoring force to the rope-like body such as the main rope 8. In this way, the control unit 24 effectively moves the positions in the longitudinal direction of the displacement measurement unit 23 and the displacement amplifier 22 among the positions of a plurality of discrete stages.

However, the second position P2 may be a position closer to the antinode than to the first position P1.

The vibration suppression device 21 may include three or more sets of the displacement measurement unit 23 and the displacement amplifier 22. At this time, the control unit 24 may select one set or two or more sets from a plurality of sets of the displacement measurement unit 23 and the displacement amplifier 22.

Embodiment 4

In Embodiment 4, points different from those in the examples disclosed in each of Embodiment 1 to Embodiment 3 will be described in particular detail. Any feature of the examples disclosed in each of Embodiment 1 to Embodiment 3 may be adopted for features which are not described in Embodiment 4.

The principle of a method of detecting the tension by a tension detection unit 34 of a vibration suppression device 21 will be described with reference to FIG. 20.

Figure 20:
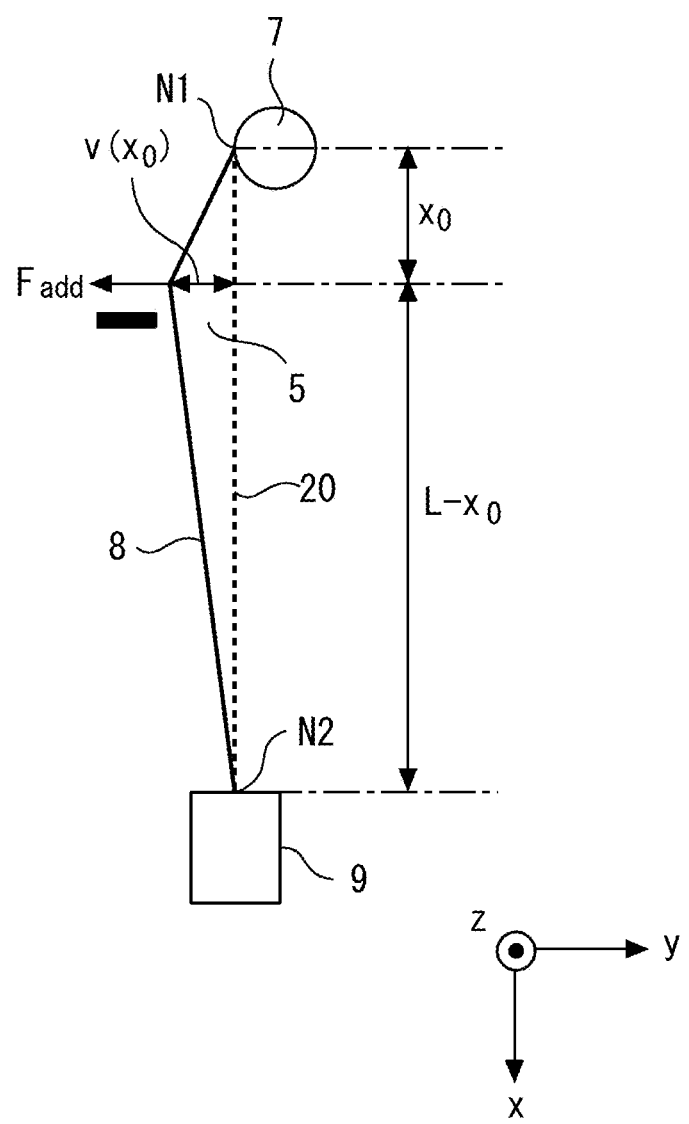
FIG. 20 A schematic diagram illustrating a state of a main rope when the tension is detected by the vibration suppression device according to Embodiment 4.

FIG. 20 is a schematic diagram illustrating a state of a main rope when the tension is detected by the vibration suppression device according to Embodiment 4.

FIG. 20 illustrates that the main rope 8 is in a state in which a constant offset force $F_{add}$ is applied from the lateral direction when no building sway is generated.

Since no building sway is generated, the force balance in the lateral direction is represented by the following Expression (21). Here, the tension of the main rope 8 is detected in the steady state in which no building sway is generated. Therefore, the displacement of the main rope 8 is represented by the function v(•) of the position in the longitudinal direction of the main rope 8.

[Math. 21]

$$F_{add} = T\frac{v(x_0)}{x_0} + T\frac{v(x_0)}{L-x_0} = Tv(x_0)\frac{L}{x_0(L-x_0)} \quad (21)$$

The tension T is obtained by the following Expression (22) by transforming Expression (21). That is, the tension detection device detects the tension T of the main rope 8 based on the displacement $v(x_0)$ of the main rope 8 at the position $x_0$ when the constant offset force $F_{add}$ is applied.

[Math. 22]

$$T = \frac{x_0(L-x_0)}{L}\frac{F_{add}}{v(x_0)} \quad (22)$$

Subsequently, a configuration of the vibration suppression device 21 will be described with reference to FIG. 21.

Figure 21:
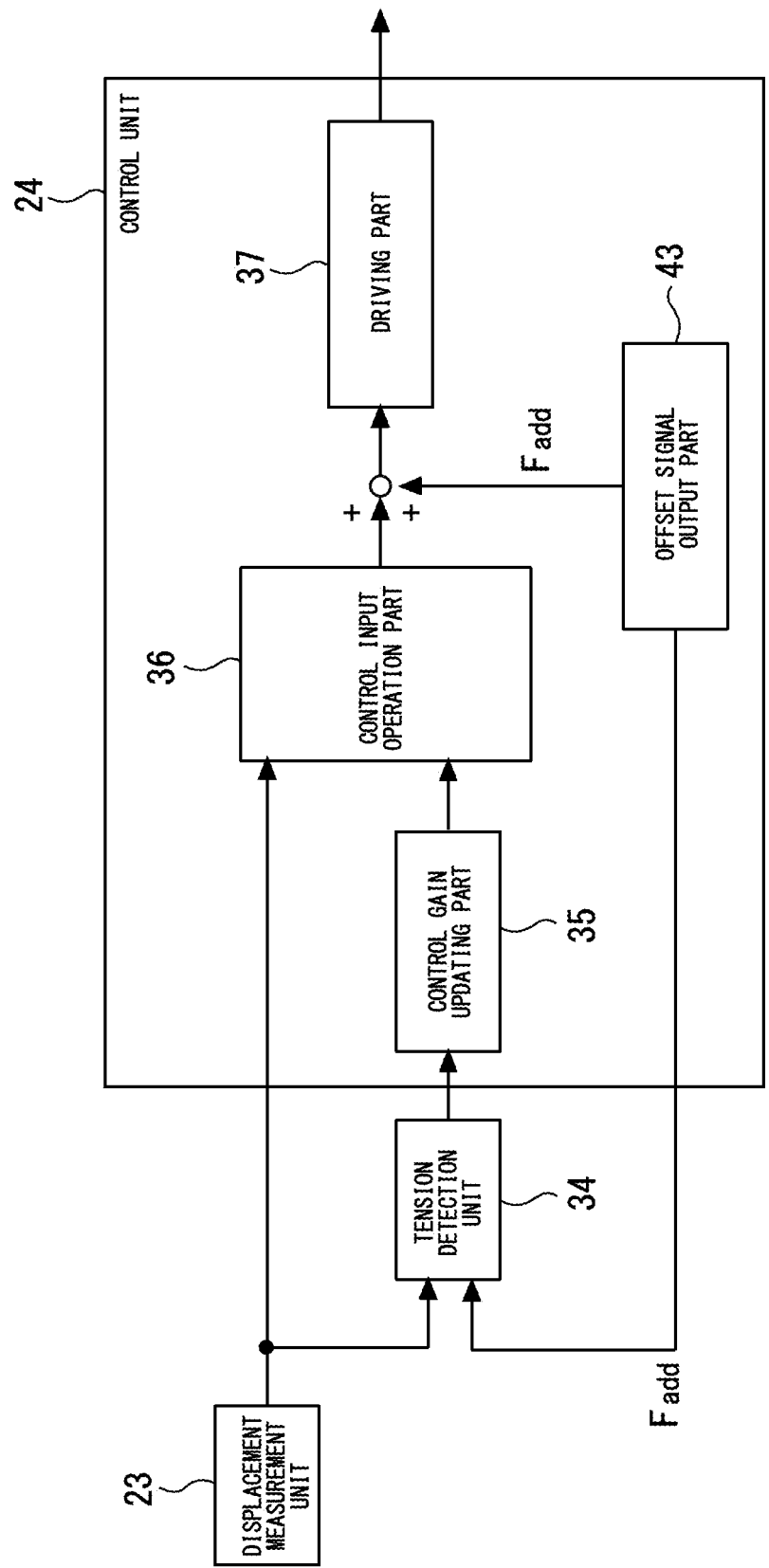
FIG. 21 A configuration diagram illustrating a configuration of the vibration suppression device according to Embodiment 4.

FIG. 21 is a configuration diagram illustrating a configuration of the vibration suppression device according to Embodiment 4.

The control unit 24 includes an offset signal output part 43. The offset signal output part 43 adds the offset value $F_{add}$ to the instruction value of the vibration suppression force. The offset signal output part 43 also outputs, to the tension detection unit 34, the offset value $F_{add}$ added to the instruction value of the vibration suppression force.

The tension detection unit 34 accepts an input of the offset value from the offset signal output part 43. The tension detection unit 34 accepts the input of the displacement measured by the displacement measurement unit 23.

Subsequently, an example of the detection of the tension by the tension detection unit 34 will be described with reference to FIG. 22.

Figure 22:
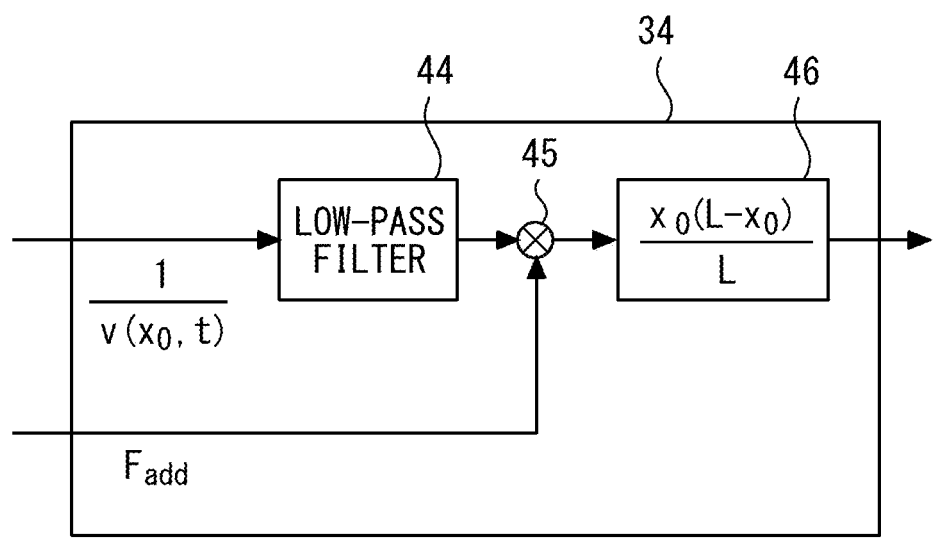
FIG. 22 A configuration diagram illustrating a configuration of the tension detection unit according to Embodiment 4.

FIG. 22 is a configuration diagram illustrating a configuration of the tension detection unit according to Embodiment 4.

The tension detection unit 34 includes a low-pass filter 44, a multiplier 45, and the tension arithmetic operator 46. The low-pass filter 44 is a filter for extracting a frequency-component signal with slow temporal variation. The range of the frequency extracted by the low-pass filter 44 is set within a range where the direct current component of the input signal can be extracted. The tension arithmetic operator 46 stores the position $x_0$ at which the displacement measurement unit 23 is provided and the coefficient $x_0(L-x_0)/L$ according to the length L of the vibrating portion of the main rope 8.

When the tension of the main rope 8 is detected, the offset signal output part 43 outputs an offset value. The displacement amplifier 22 applies the offset force $F_{add}$ to the main rope 8 from the lateral direction, based on the input offset value. The displacement measurement unit 23 measures the displacement of the main rope 8 due to the offset force $F_{add}$. The displacement of the main rope 8 due to the offset force $F_{add}$ corresponds to the direct current component of the displacement of the main rope 8, for example.

The tension detection unit 34 accepts the input of the displacement measured by the displacement measurement unit 23. In this example, the tension detection unit 34 takes the inverse of the displacement $v(x_0, t)$ as pre-processing of the low-pass filter 44. The low-pass filter 44 accepts an input of the signal of the inverse of the displacement. The low-pass filter 44 extracts the direct current component of the input signal. The low-pass filter 44 outputs the extracted direct current component to the multiplier 45. The multiplier 45 multiplies the offset value $F_{add}$ by the direct current component signal input from the low-pass filter 44. The multiplier 45 outputs the multiplied value to the tension arithmetic operator 46. The tension arithmetic operator 46 obtains the value of the tension T based on Expression (22) by multiplying the stored coefficient $x_0(L-x_0)/L$ by the value input from the multiplier 45. The tension arithmetic operator 46 outputs the obtained value of the tension T to the control unit 24.

Subsequently, an example of the operation of the vibration suppression device 21 will be described with reference to FIG. 23.

Figure 23:
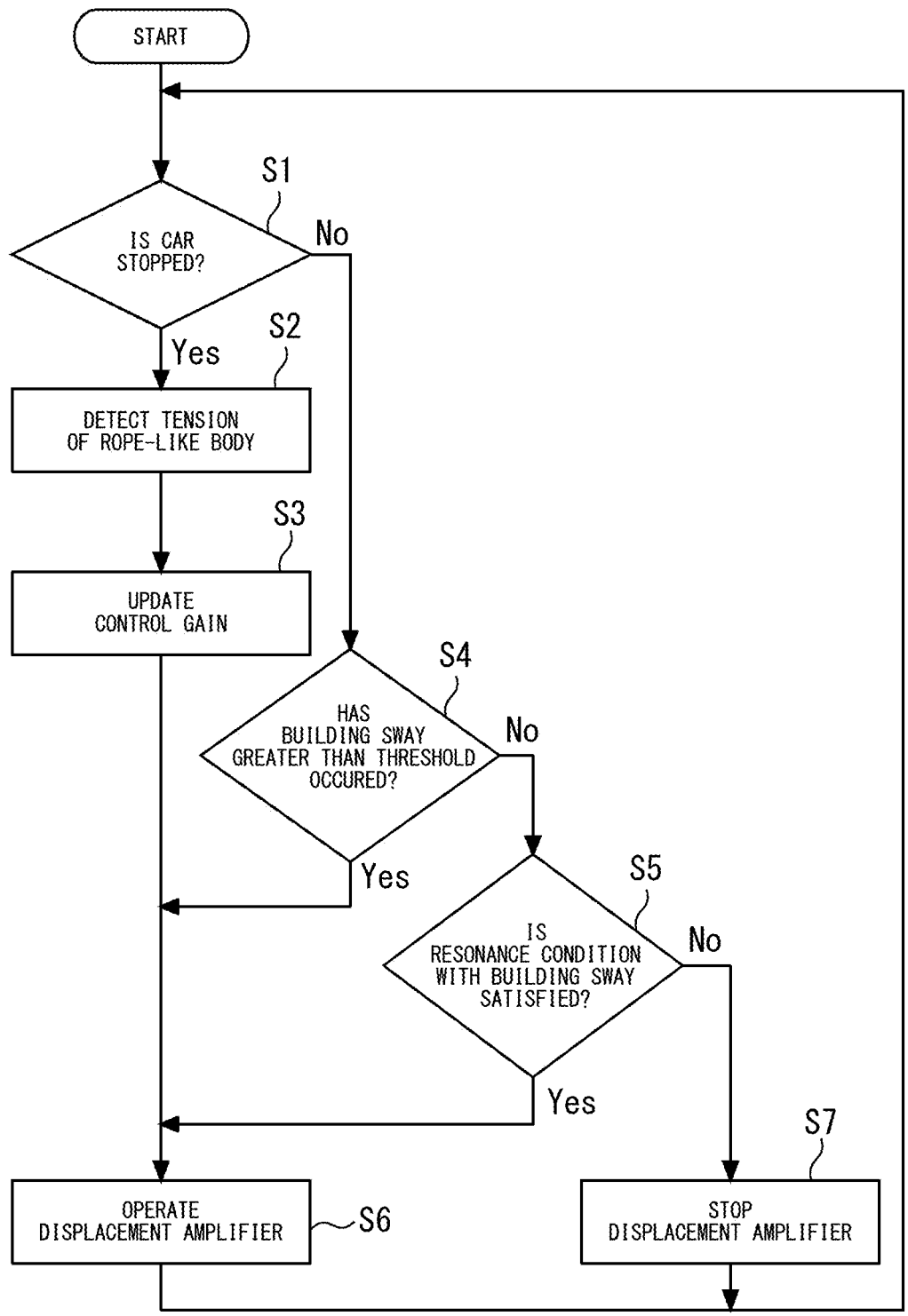
FIG. 23 A flowchart illustrating an example of the operation of the vibration suppression device according to Embodiment 4.

FIG. 23 is a flowchart illustrating an example of the operation of the vibration suppression device according to Embodiment 4.

In step S1, the control unit 24 judges whether the car 9 is stopped based on the control signal obtained from the control panel 17, for example. When the judgement result is Yes, the operation of the vibration suppression device 21 proceeds to step S2. When the judgement result is No, the operation of the vibration suppression device 21 proceeds to step S4.

In step S2, the tension detection unit 34 detects the tension of the rope-like body. Then, the operation of the vibration suppression device 21 proceeds to step S3.

In step S3, the control gain updating part 35 of the control unit 24 updates the control gain based on the detected tension. Then, the operation of the vibration suppression device 21 proceeds to step S6.

In step S4, the control unit 24 judges whether the building sway greater than the preset threshold has occurred, based on the detection signal obtained from the building sway detector 18, for example. When the judgement result is No, the operation of the vibration suppression device 21 proceeds to step S5. When the judgement result is Yes, the operation of the vibration suppression device 21 proceeds to step S6.

In step S5, the control unit 24 judges whether the rope-like body satisfies a resonance condition with the building sway. The resonance condition is, for example, a condition such that the frequency of the building sway coincides with the natural frequency of the rope-like body. Alternatively, the resonance condition may be, for example, a condition such that a difference between the frequency of the building sway and the natural frequency of the rope-like body falls within a predetermined frequency range based on the measurement error or the safety factor, for example. When the judgement result is Yes, the operation of the vibration suppression device 21 proceeds to step S6. When the judgement result is No, the operation of the vibration suppression device 21 proceeds to step S7.

In step S6, the control unit 24 activates the displacement amplifier 22. That is, the control unit 24 causes the displacement amplifier 22 to apply the vibration suppression force to the rope-like body. Note that, when the control gain is not updated by the control gain updating part 35, the control unit 24 may cause the displacement amplifier 22 to apply the vibration suppression force based on the control gain last updated. Alternatively, the control unit 24 may cause the displacement amplifier 22 to apply the vibration suppression force based on the preset control gain. Then, the operation of the vibration suppression device 21 proceeds to step S1.

In step S7, the control unit 24 stops the displacement amplifier 22. At this time, the displacement in the lateral direction of the rope-like body is not amplified by the displacement amplifier 22. Then, the operation of the vibration suppression device 21 proceeds to step S1.

As described above, the control unit 24 of the vibration suppression device 21 according to Embodiment 4 causes the first displacement amplifier to apply the constant offset force in the lateral direction to the rope-like body. The tension detection unit 34 detects the tension of the rope-like body based on the displacement of the rope-like body due to the offset force.

Therefore, the control unit 21 can detect the tension of the main rope 8 based on the measurement without requiring addition of new hardware for detecting the tension.

The tension detection unit 34 detects the tension of the rope-like body when the car 9 of the elevator 1 is stopped. The tension detection unit 34 does not detect the tension of the rope-like body while the car 9 of the elevator 1 is running.

The tension of the rope-like body such as the main rope 8 varies depending on the operation conditions of the elevator 1 such as the weight of the car 9. The weight of the car 9 which is an example of the operation conditions varies depending on the boarding and alighting of passengers or the like. The passengers board the car 9 and alight from the car 9 when the car 9 is stopped. Therefore, the tension detection unit 34 detects the tension at the timing at which a state of the tension of the rope-like body easily varies. The tension detection unit 34 does not operate when the necessity is low. This results in savings of an arithmetic operation resource in the elevator 1.

The control unit 24 updates the magnitude of the displacement control gain when the car 9 of the elevator 1 is stopped. The control unit 24 does not update the magnitude of the displacement control gain while the car 9 of the elevator 1 is running.

This can prevent the running operation of the car 9 from becoming unstable due to variations in the control gain. Additionally, this can prevent chattering from occurring due to the switching of the value of the control gain.

The control unit 24 causes the first displacement amplifier to apply the negative restoring force when the car 9 of the elevator 1 is stopped. The control unit 24 does not cause the first displacement amplifier to apply the negative restoring force while the car 9 of the elevator 1 is running.

The rope-like body such as the main rope 8 is easily affected by the vibration due to the building sway when the car 9 is stopped. Therefore, the control unit 24 operates the displacement amplifier 22 at the timing at which the rope-like body vibrates easily and greatly. The displacement amplifier 22 does not operate when the necessity is low. This can suppress energy consumption caused by standby power of the displacement amplifier 22.

The control unit 24 causes the first displacement amplifier to apply the negative restoring force when the building sway greater than the preset threshold is occurring. The control unit 24 does not cause the first displacement amplifier to apply the negative restoring force when the building sway greater than the threshold does not occur.

The control unit 24 operates the displacement amplifier 22 at the timing of being affected by the vibration due to the building sway. The displacement amplifier 22 does not operate when the necessity is low. This can suppress energy consumption caused by standby power of the displacement amplifier 22.

The control unit 24 causes the first displacement amplifier to apply the negative restoring force when the rope-like body satisfies the resonance condition with the building sway. The control unit 24 does not cause the first displacement amplifier to apply the negative restoring force when the rope-like body does not satisfy the resonance condition.

The control unit 24 operates the displacement amplifier 22 at the timing at which the resonance phenomenon occurs due to the building sway. The displacement amplifier 22 does not operate when the necessity is low. This can suppress energy consumption caused by standby power of the displacement amplifier 22.

However, the control unit 24 may omit some or all of the judgement on stop of the car 9, the judgement on occurrence of the building sway, and the judgement on the resonance condition. For example, when all of the judgements are omitted, the control unit 24 may operate the displacement amplifier 22 at all times. When the displacement amplifier 22 is operated at all times, the vibration suppression device 21 can respond to great building sway which has unexpectedly occurred. Since the vibration suppression device 21 operates at all times, the force required in the initial stage of the vibration suppression is prevented from becoming large due to delay of the vibration suppression. The vibration suppression device 21 does not require the information about the building sway, the information about the running state of the car 9, and the like. This prevents an increase in wiring or communication path between the vibration suppression device 21 and the control panel 17.

The operation of switching the operation of the displacement amplifier 22 for some or all of the judgement on stop of the car 9, the judgement on occurrence of the building sway, and the judgement on the resonance condition can be applied to any of the vibration suppression devices 21 according to Embodiments 1 to 3. The operations of detecting the tension or updating the control gain according to the judgement on stop of the car 9 can be applied to any of the vibration suppression devices 21 according to Embodiments 2 or 3.

INDUSTRIAL APPLICABILITY

The vibration suppression device according to the present invention can be applied to an elevator.

REFERENCE SIGNS LIST

1 Elevator
2 Building
3 Hoistway
4 Machine room
5 Rope duct

6 Pit
7 Traction machine
8 Main rope
9 Car
10 Counterweight
11 Compensation rope
12 Tension sheave
13 Governor
14 Governor rope
15 Governor rope tension sheave
16 Traveling cable
17 Control panel
18 Building sway detector
19 Building sway
20 Equilibrium position
21 Vibration suppression device
22, 22a, 22b Displacement amplifier
23, 23a, 23b Displacement measurement unit
24 Control unit
25 Contact portion
26 Actuator
27 Roller
28 Stator
29 Mover
30 Ball screw
31 Nut
32 Motor
33 Force sensor
34 Tension detection unit
35 Control gain updating part
36 Control input operation part
37 Driving part
38 Displacement feedback arithmetic operator
39 Velocity feedback arithmetic operator
40 Differentiator
41 Load weighing device
42 Movable mechanism
43 Offset signal output part
44 Low-pass filter
45 Multiplier
46 Tension arithmetic operator
24a Hardware
24b Processor
24c Memory
P1 First position
P2 Second position

The invention claimed is:

1. A vibration suppression device for a rope-like body of an elevator, comprising:
a first displacement meter to measure a displacement in a lateral direction of the rope-like body due to vibration about an equilibrium position at a first position in a longitudinal direction of the rope-like body of the elevator;
a first displacement amplifier to apply, to the rope-like body, a negative restoring force that amplifies the displacement of the rope-like body; and
processing circuitry to cause the first displacement amplifier to apply the negative restoring force smaller than a positive restoring force to return the rope-like body to the equilibrium position, based on the displacement measured by the first displacement meter, wherein
the processing circuitry causes the first displacement amplifier to apply the negative restoring force when the rope-like body satisfies a resonance condition with building sway, and does not cause the first displacement amplifier to apply the negative restoring force when the rope-like body does not satisfy the resonance condition.

2. The vibration suppression device for the rope-like body of the elevator according to claim 1, wherein
the resonance condition is a condition such that a difference between a frequency of the building sway and the natural frequency of the rope-like body falls within a predetermined frequency range.

3. The vibration suppression device for the rope-like body of the elevator according to claim 1, wherein
the resonance condition is a condition such that a frequency of the building sway coincides with the natural frequency of the rope-like body.

4. The vibration suppression device for the rope-like body of the elevator according to claim 1, wherein
the processing circuitry causes the first displacement amplifier to apply the negative restoring force smaller than a lower limit of the positive restoring force predetermined according to a range of variations in tension of the rope-like body.

5. The vibration suppression device for the rope-like body of the elevator according to claim 1, further comprising:
a tension detector to detect tension of the rope-like body,
wherein the processing circuitry causes the first displacement amplifier to apply the negative restoring force smaller than the positive restoring force determined according to the tension, based on the tension detected by the tension detector.

6. The vibration suppression device for the rope-like body of the elevator according to claim 5, wherein
the tension detector detects tension of the rope-like body based on a weight measured by a load weigher of the elevator.

7. The vibration suppression device for the rope-like body of the elevator according to claim 5, wherein
the tension detector detects tension of the rope-like body based on the displacement measured by the first displacement meter.

8. The vibration suppression device for the rope-like body of the elevator according to claim 5, wherein
the tension detector detects tension of the rope-like body when a car of the elevator is stopped, and does not detect tension of the rope-like body while the car of the elevator is running.

9. The vibration suppression device for the rope-like body of the elevator according to claim 5, wherein
the processing circuitry updates magnitude of a negative displacement control gain based on the tension detected by the tension detector and causes the first displacement amplifier to apply, as the negative restoring force, a negative rigidity force based on the negative displacement control gain and the displacement.

10. The vibration suppression device for the rope-like body of the elevator according to claim 9, wherein
the processing circuitry updates magnitude of the displacement control gain when a car of the elevator is stopped, and does not update the magnitude of the displacement control gain while the car of the elevator is running.

11. The vibration suppression device for the rope-like body of the elevator according to claim 9, wherein
the processing circuitry detects a velocity of the displacement based on the displacement measured by the first displacement meter, updates magnitude of a velocity control gain based on the tension detected by the tension detector, and causes the first displacement amplifier to apply, to the rope-like body, a viscous force in a lateral direction based on the velocity control gain and the velocity.

* * * * *